United States Patent
Mizuno et al.

(10) Patent No.: US 8,044,340 B2
(45) Date of Patent: Oct. 25, 2011

(54) ENCODER AND LIGHT RECEIVING DEVICE FOR ENCODER

(75) Inventors: Seiichiro Mizuno, Hamamatsu (JP); Yoshitaka Terada, Hamamatsu (JP); Hitoshi Inoue, Hamamatsu (JP); Takayuki Suzuki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/883,070

(22) PCT Filed: Oct. 10, 2006

(86) PCT No.: PCT/JP2006/320204
§ 371 (c)(1), (2), (4) Date: Jul. 26, 2007

(87) PCT Pub. No.: WO2007/043521
PCT Pub. Date: Apr. 19, 2007

(65) Prior Publication Data
US 2008/0185505 A1    Aug. 7, 2008

(30) Foreign Application Priority Data
Oct. 13, 2005 (JP) .............................. P2005-299068

(51) Int. Cl.
*G01D 5/34* (2006.01)
*H03M 1/22* (2006.01)

(52) U.S. Cl. ......... 250/231.16; 250/231.17; 250/231.18; 341/13

(58) Field of Classification Search ............. 250/231.12–231.18, 237 G, 237 R; 356/616, 617; 341/11, 13, 31; 33/1 PT
See application file for complete search history.

(56) References Cited

U.S. PATENT DOCUMENTS

| | | | | |
|---|---|---|---|---|
| 4,074,258 A | * | 2/1978 | Dore et al. | 341/13 |
| 4,421,980 A | | 12/1983 | Kühne | |
| 4,587,513 A | * | 5/1986 | Burrowes et al. | 341/13 |
| 4,631,519 A | | 12/1986 | Johnston | |
| 4,644,157 A | | 2/1987 | Ozawa et al. | |
| 4,827,123 A | * | 5/1989 | Gray | 250/231.14 |
| 4,849,621 A | | 7/1989 | Yanase et al. | |
| 4,906,992 A | | 3/1990 | Wingate et al. | |
| 4,947,166 A | | 8/1990 | Wingate et al. | |
| 5,026,985 A | * | 6/1991 | Ishizuka et al. | 250/231.16 |
| 5,274,476 A | * | 12/1993 | Lee | 358/483 |

(Continued)

FOREIGN PATENT DOCUMENTS
JP       60-47917       3/1985
(Continued)

*Primary Examiner* — Georgia Y Epps
*Assistant Examiner* — Don Williams
(74) *Attorney, Agent, or Firm* — Drinker Biddle & Reath LLP

(57) ABSTRACT

An encoder is provided in which the absolute angle can be detected with high accuracy even when the irradiated position of light to be detected with respect to a scale is displaced from a reference, and a photodetecting device for an encoder used for such an encoder. In the encoder 1, by passing light to be detected through a straight-line light transmitting portion 17, a bright portion 19 to which the light to be detected is irradiated is formed in an area of a scale plate 11 containing mutually separate parts of arranged lines L1 and L2 and also a dark portion 20 to which no light to be detected is irradiated is formed in the other area.

10 Claims, 20 Drawing Sheets

U.S. PATENT DOCUMENTS

| | | | |
|---|---|---|---|
| 5,640,007 A | 6/1997 | Talbott et al. | |
| 5,642,297 A * | 6/1997 | Brady et al. | 702/152 |
| 5,774,219 A | 6/1998 | Matsuura | |
| 6,127,676 A | 10/2000 | Tseng | |
| 7,544,925 B2 | 6/2009 | Mizuno et al. | |
| 7,608,813 B1 | 10/2009 | Milvich et al. | |
| 2002/0014581 A1 | 2/2002 | Yamamoto et al. | |
| 2002/0178939 A1 | 12/2002 | Tsuruta et al. | |
| 2005/0116153 A1 * | 6/2005 | Hataguchi et al. | 250/231.13 |
| 2007/0114283 A1 | 5/2007 | Foo | |
| 2008/0083869 A1 | 4/2008 | Mizuno et al. | |
| 2008/0185505 A1 | 8/2008 | Mizuno et al. | |
| 2010/0006748 A1 | 1/2010 | Mizuno et al. | |

FOREIGN PATENT DOCUMENTS

| | | |
|---|---|---|
| JP | 60-210718 | 10/1985 |
| JP | 61-14518 | 1/1986 |
| JP | 61-169703 | 7/1986 |
| JP | 61-241621 | 10/1986 |
| JP | 62-163724 | 10/1987 |
| JP | 1-196514 | 8/1989 |
| JP | 8-10145 | 1/1996 |
| JP | 9-196706 | 7/1997 |
| JP | 11-148844 | 6/1999 |
| JP | 2000-146625 | 5/2000 |
| JP | 2002-48602 | 2/2002 |
| JP | 2002-139353 | 5/2002 |
| JP | 2003-315101 | 11/2003 |
| JP | 2004-317357 | 11/2004 |
| JP | 2005-121612 | 5/2005 |
| JP | 2006-119082 | 5/2006 |

* cited by examiner

ENCODER AND LIGHT RECEIVING DEVICE FOR ENCODER

TECHNICAL FIELD

The present invention relates to an optical encoder and a photodetecting device for an encoder.

BACKGROUND ART

For example, an optical encoder described in Patent Document 1 is known as a conventional optical encoder. The conventional encoder has an optical scale in which lattice windows having different diffracting patterns are annularly arranged, and diffracted patterns of light to be detected to the lattice windows through a slit are picked up by an image sensor. Then, the lattice windows are specified from the picked-up diffracted patterns, and also the positions of the lattice windows are specified on the basis of the positions of the diffracted patterns in the image, whereby the absolute angle of a measurement target is detected.

Patent Document 1: Japanese Published Examined Patent Application No. H08-10145

DISCLOSURE OF THE INVENTION

Problem to be Solved by the Invention

However, in the conventional optical encoder, the absolute angle is directly detected from the position of each specified lattice window. Therefore, when the arrangement relationship of the respective members constituting an optical system is displaced due to difficulties of disk processing of the scale, subsequent age-based deterioration or the like, and thus the irradiated position of the light to be detected with respect to the scale is displaced from a reference, the detection accuracy of the absolute angle is lowered.

The present invention has been implemented to solve the above problem, and has an object to provide an encoder that can detect an absolute angle with high accuracy even when the irradiated position of light to be detected with respect to a scale is displaced from a reference and a photodetecting device for an encoder used for such an encoder.

Means for Solving the Problem

In order to solve the above problem, an encoder according to the present invention includes: a rotating member; a light source device for emitting light to be detected to the rotating member; and a photodetecting device including a scale having a plurality of photodetecting elements arranged thereon, and an output portion for outputting an output signal based on the light intensity of the light to be detected made incident to the photodetecting elements through the rotating member, wherein the photodetecting elements are arranged along an annularly arranged line on the scale, and the rotating member is designed so that, in the scale, an area containing mutually separate parts of the arranged line is set as a bright portion to which the light to be detected is irradiated, and an area containing the other portion excluding the parts of the arranged line concerned is set as a dark portion to which no light to be detected is irradiated.

The encoder has the rotating member that sets, in the scale having the plurality of photodetecting elements arranged annularly thereon, the area containing mutually separate parts of the arranged line as the bright portion to which the light to be detected is irradiated, and the area containing the other portion excluding the mutually separate parts of the arranged line, as the dark portion to which no light to be detected is irradiated. Accordingly, at least two light intensity peaks are obtained from a one-dimensional profile of the output signal from the photodetecting elements, and the absolute angle can be calculated by specifying the photodetecting element corresponding to one light intensity peak. On the other hand, a relative angle between one light intensity peak and the other light intensity peak (reference relative angle) can be grasped from the shape of the bright portion formed on the scale in advance. Here, if the irradiated position of the light to be detected with respect to the scale is displaced, a relative angle between the light intensity peaks on detecting the angle is displaced from the reference relative angle by a fixed amount. Therefore, in this encoder, the deviation amount of the relative angle is calculated as a corrected amount, and the corrected amount is added to or subtracted from the absolute angle determined from one light intensity peak, whereby the absolute angle can be detected with high accuracy even when the irradiated position of the light to be detected with respect to the scale is displaced from the reference.

In addition, it is preferable that a straight-line light transmitting portion is formed in the rotating member, and the bright portion is formed of the light to be detected that has passed through the light transmitting portion. In this case, two light intensity peaks are obtained from a one-dimensional profile of the output signal, and a reference relative angle therebetween is uniquely provided as 180°. Accordingly, a corrected amount can be easily calculated.

In addition, it is preferable that, for the light transmitting portion, the width of one end side is different from the width of the other end side. Since this causes a difference in the width (full width at half maximum) between the two light intensity peaks, these light intensity peaks can be discriminated. Accordingly, it becomes possible to extend the angle detection range of the encoder.

In addition, it is preferable that a straight-line light reflecting portion is formed in the rotating member, and the bright portion is formed of the light to be detected reflected from the light reflecting portion.

In addition, the light transmitting portion is preferably a slit. In this case, the construction of the light transmitting portion is simplified, whereby a reduction in the cost of the encoder can be realized.

In addition, it is preferable that, for the light reflecting portion, the width of one end side is different from the width of the other end side. Since this causes a difference in the width (full width at half maximum) between the two light intensity peaks, these light intensity peaks can be discriminated. Accordingly, it becomes possible to extend the angle detection range of the encoder.

In addition, it is preferable that the photodetecting elements are arranged in a zigzag form along the arranged line. In this case, the resolution of the angle detection can be enhanced while keeping the scale compact.

In addition, it is preferable that, in the scale, a light absorbing film is formed in the area excluding the area where the photodetecting elements are arranged. According to such a construction, the effect of multiple reflections of the light to be detected, etc., can be moderated, and the S/N ratio of the one-dimensional profile of the output signal obtained from the photodetecting elements can be enhanced.

In addition, a photodetecting device for an encoder according to the present invention includes: a scale having a plurality of photodetecting elements arranged thereon; and an output portion for outputting an output signal based on light intensity of light to be detected made incident to the photodetecting elements, wherein the photodetecting elements are arranged along an annularly arranged line on the scale, and in the scale, a light absorbing film is formed in an area excluding the area where the photodetecting elements are arranged.

In the photodetecting device for an encoder, by interposing a rotating member between the same and a light source device, an area containing mutually separate parts of the arranged line, in the scale having the plurality of photodetecting elements arranged annularly thereon, can be set as a bright portion to which light to be detected is irradiated, and an area containing the other portion excluding the parts of the arranged line can be set as a dark portion to which no light to be detected is irradiated. Accordingly, at least two light intensity peaks are obtained from a one-dimensional profile of the output signal from the photodetecting elements, and the absolute angle can be calculated by specifying the photodetecting element corresponding to one light intensity peak. On the other hand, a relative angle between one light intensity peak and the other light intensity peak (reference relative angle) can be grasped from the shape of the bright portion formed on the scale in advance. Here, if the irradiated position of the light to be detected with respect to the scale is displaced, the relative angle between the light intensity peaks on detecting the angle is displaced from the reference relative angle by a fixed amount. Therefore, in this encoder, the deviation amount of the relative angle is calculated as a corrected amount, and the corrected amount is added to or subtracted from the absolute angle determined from one light intensity peak, whereby the absolute angle can be detected with high accuracy even when the irradiated position of the light to be detected with respect to the scale is displaced from the reference.

In addition, it is preferable that the output portion has a shift register that makes the output signal based on light intensity output in sequence from the photodetecting elements, and the shift register is arranged inside the arranged line. It becomes possible to miniaturize the scale by arranging the shift register in an extra space inside the arranged line.

In addition, it is preferable that the photodetecting elements are arranged in a zigzag form along the arranged line. In this case, the resolution of the angle detection can be enhanced while keeping the scale compact.

EFFECTS OF THE INVENTION

According to the encoder and the photodetecting device for an encoder of the present invention, even when the irradiated position of the light to be detected with respect to the scale is displaced from the reference, the absolute angle can be detected with high accuracy.

Figure 1:
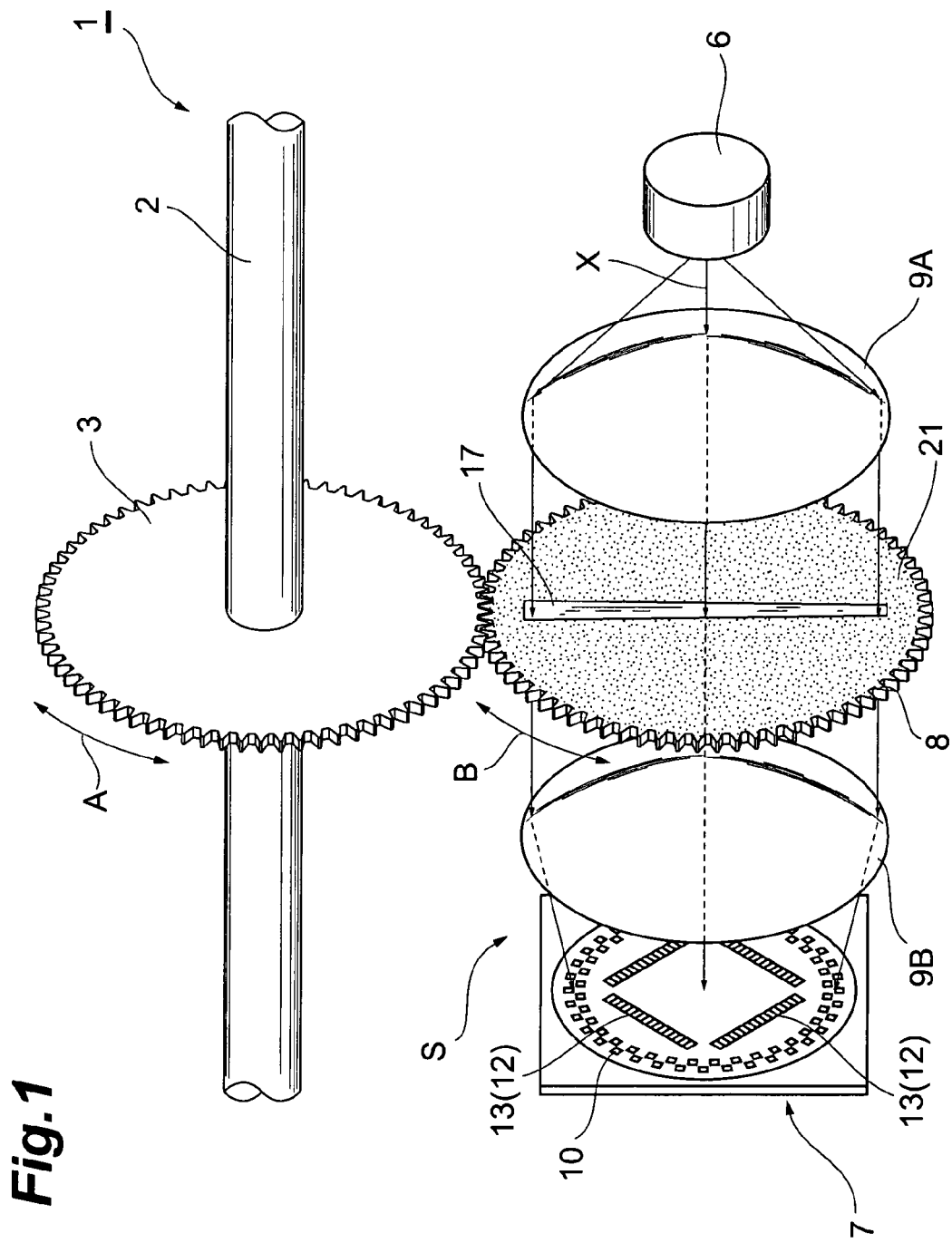
FIG. 1 is a perspective view showing an encoder according to a first embodiment of the present invention.

DESCRIPTION OF THE REFERENCE NUMERALS 1, 3 . . . encoder, 6 . . . LED (light source device), 7 . . . photodetecting device, 8, 31 . . . rotating plate (rotating member) having a toothed gear, 10 . . . PD (photodetecting element), 11 . . . scale plate, 12 . . . output portion, 13 . . . shift register, 17 . . . light transmitting portion, 18 . . . light absorbing film, 19 . . . bright portion, 20 . . . dark portion, 32 . . . light reflecting portion, L1 . . . first arranged line, L2 . . . second arranged line, W1 . . . width of one end side of light transmitting portion, W2 . . . width of the other end side of light transmitting portion, W3 . . . width of one end side of light reflecting portion, W4 . . . width of the other end side of light reflecting portion, 101 . . . encoder, 106 . . . LED (light source device), 107 . . . photodetecting device, 108 . . . slit plate (rotating member) having a toothed gear, 110 . . . PD (photodetecting element), 111 . . . scale plate, 112 . . . output portion, 113 . . . shift register, 117, 120 . . . slit (light transmitting portion), L101 . . . first arranged line, L102 . . . second arranged line, W101 . . . slit width of one end side, W102 . . . slit width of the other end side, X . . . optical axis

BEST MODE FOR CARRYING OUT THE INVENTION

A preferred embodiment of an encoder and a photodetecting device for an encoder according to the present invention will be described in detail with reference to the drawings.

First Embodiment

FIG. 1 is a perspective view showing an encoder according to a first embodiment of the present invention. The encoder 1 shown in FIG. 1 is a so-called absolute type rotary encoder, and it is a device for detecting the absolute angle of a measurement target (not shown) such as the handle of a vehicle or the like. This encoder 1 is equipped with a rotational shaft 2 linked to the measurement target, and a disk 3 having a toothed gear fixed to the rotational shaft 2. The disk 3 having the toothed gear is rotated in the direction of an arrow A in connection with the rotation of the rotational shaft 2 interlocked with the measurement target.

Figure 2:
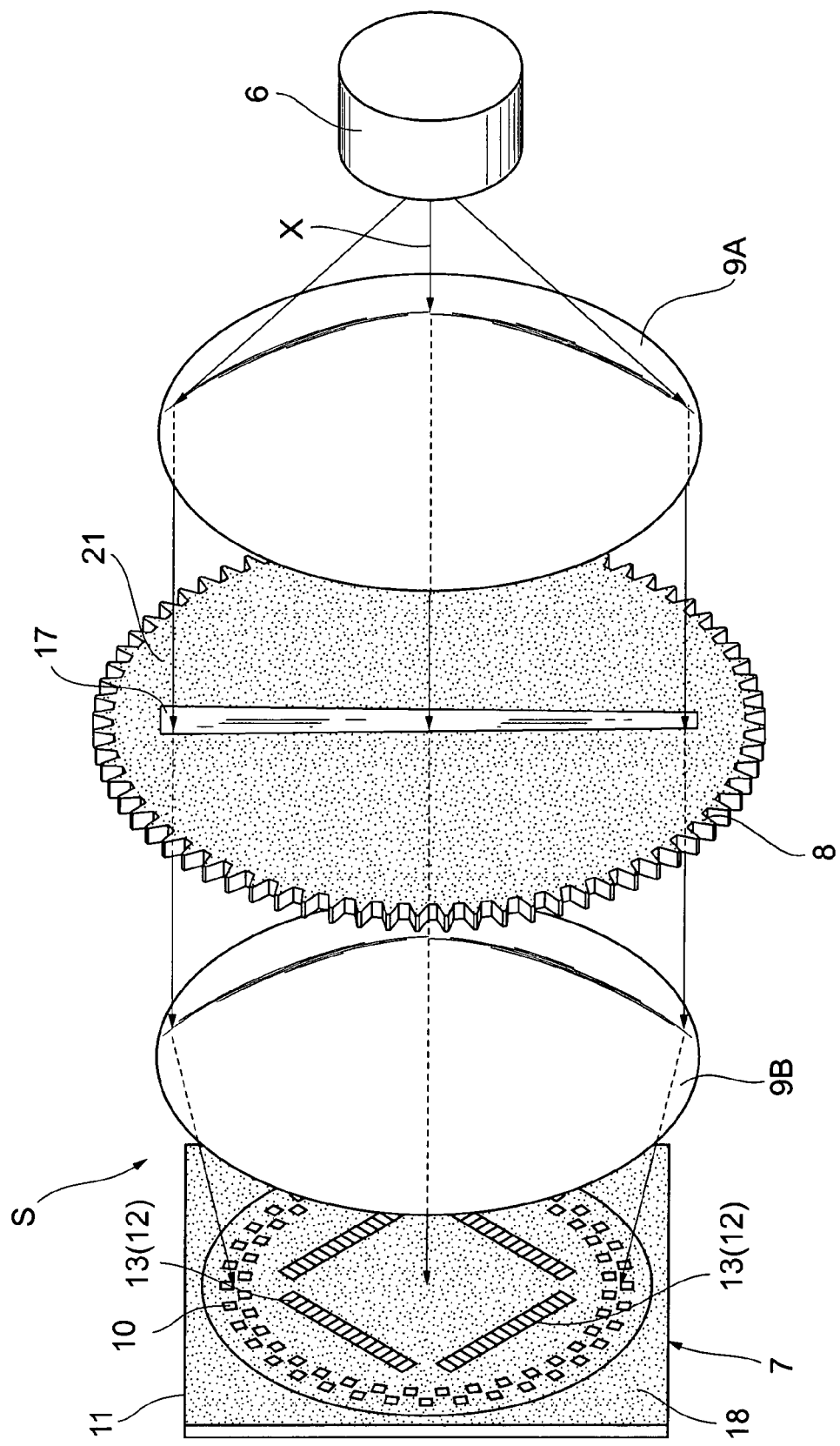
FIG. 2 is a perspective view showing an optical system of the encoder shown in FIG. 1.

FIG. 2 is a perspective view showing an optical system S of the encoder 1. As shown in FIG. 2, the optical system S of the encoder 1 is composed of an LED (light source device) 6 being a spot light source for emitting light to be detected, a photodetecting device (photodetecting device for an encoder) 7 that is disposed so as to face LED 6 and photodetects the light to be detected, a rotating plate (rotating member) 8 having a toothed gear which is engaged with the disk 3 having the toothed gear, and a pair of collimating lens 9A and 9B disposed so as to sandwich the rotating plate 8 having the toothed gear therebetween.

Figure 3:
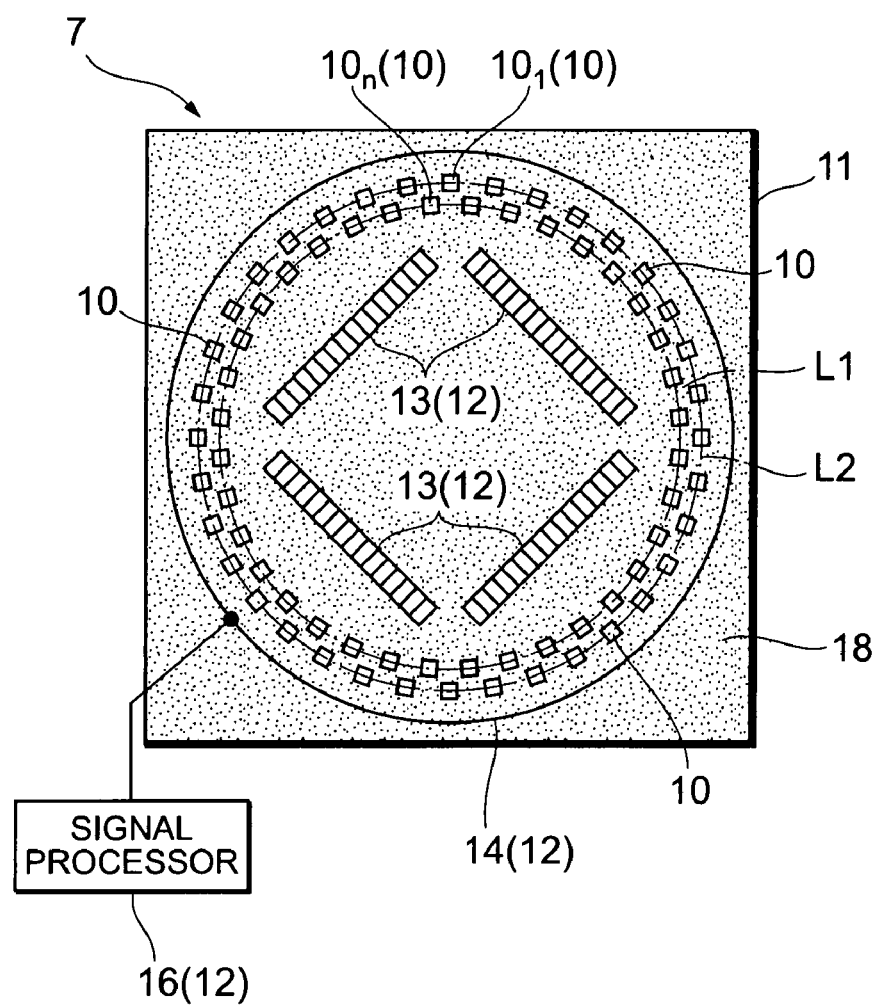
FIG. 3 is a plan view of a photodetecting device.

As shown in FIG. 3, the photodetecting device 7 has a scale plate 11 having a plurality of PDs (photodetecting elements) 10 arranged thereon, and an output portion 12 for outputting an output signal from each PD 10. A first arranged line L1 and a second arranged line L2 are concentrically set on the scale plate 11, and the respective PDs 10 are annularly arranged in a zigzag form on the arranged lines L1 and L2. Angle information is allocated to the respective PDs 10 from the first PD $10_1$ (0°) to the last PD $10_n$ (359.5°), for example, at an angular interval of 0.5° in the clockwise direction. Furthermore, by print or the like, a light absorbing film 18 of black resin which contains carbon, for example, is formed in the area on the surface of the scale plate 11 excluding the area where PDs 10 are arranged.

The output portion 12 has a plurality of (four in this embodiment) shift registers 13, a video line 14 and a signal processor 16. The respective shift registers 13 are arranged in a substantially rectangular form concentrically with the scale plate 11 at the inside of the respective arranged lines L1 and L2, and supply scan signals to the respective PDs 10 for outputting the output signal based on the light intensity of the photodetected light to be detected. The video line 14 is concentrically arranged at the outside of the arranged lines L1 and L2, and outputs an output signal from each PD 10 to the signal processor 16. The signal processor 16 outputs the output signal received from each PD 10 via the video line 14 to the outside. A supply line (not shown) for a driving signal to each shift register 13 is connected between PD $10_1$ and PD $10_n$, for example.

Figure 4:
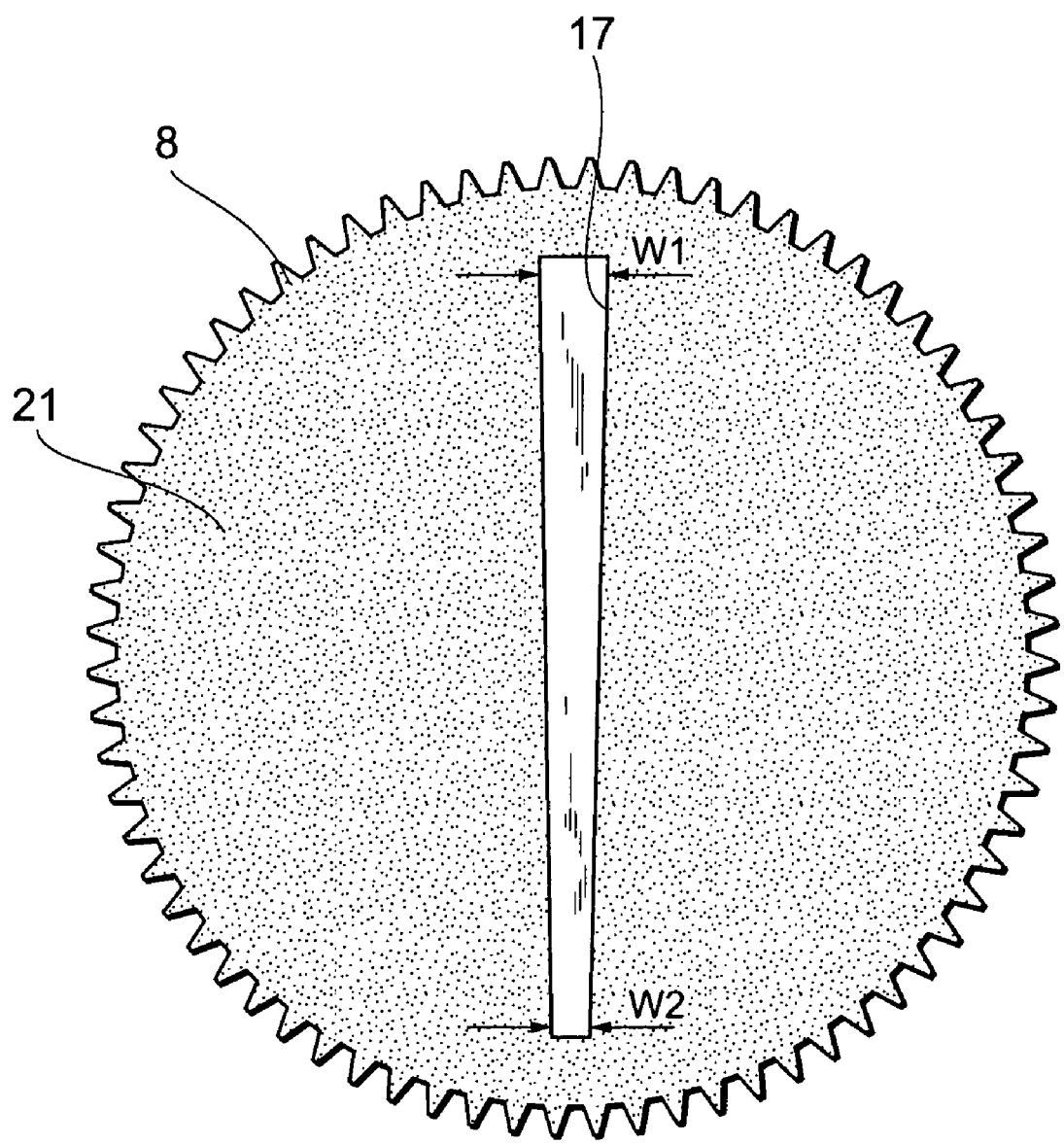
FIG. 4 is a plan view of a rotating plate having a toothed gear.

On the other hand, as shown in FIG. 4, the rotating plate 8 having the toothed gear has a light transmitting portion 17 through which a part of the light to be detected emitted from LED 6 is passed. The light transmitting portion 17 is formed of, for example, glass in a straight-line shape so as to pass through the center of the rotating plate 8 having the toothed gear. In addition, the light transmitting portion 17 is formed so that the width is gradually reduced from one end side to the other end side, and the width W1 of one end side is about twice the width W2 of the other end side. Furthermore, a light absorbing film 21 is formed of the same material as the light absorbing film 18 on the surface of the rotating plate 8 having the toothed gear in the area excluding the light transmitting portion 17.

Figure 5:
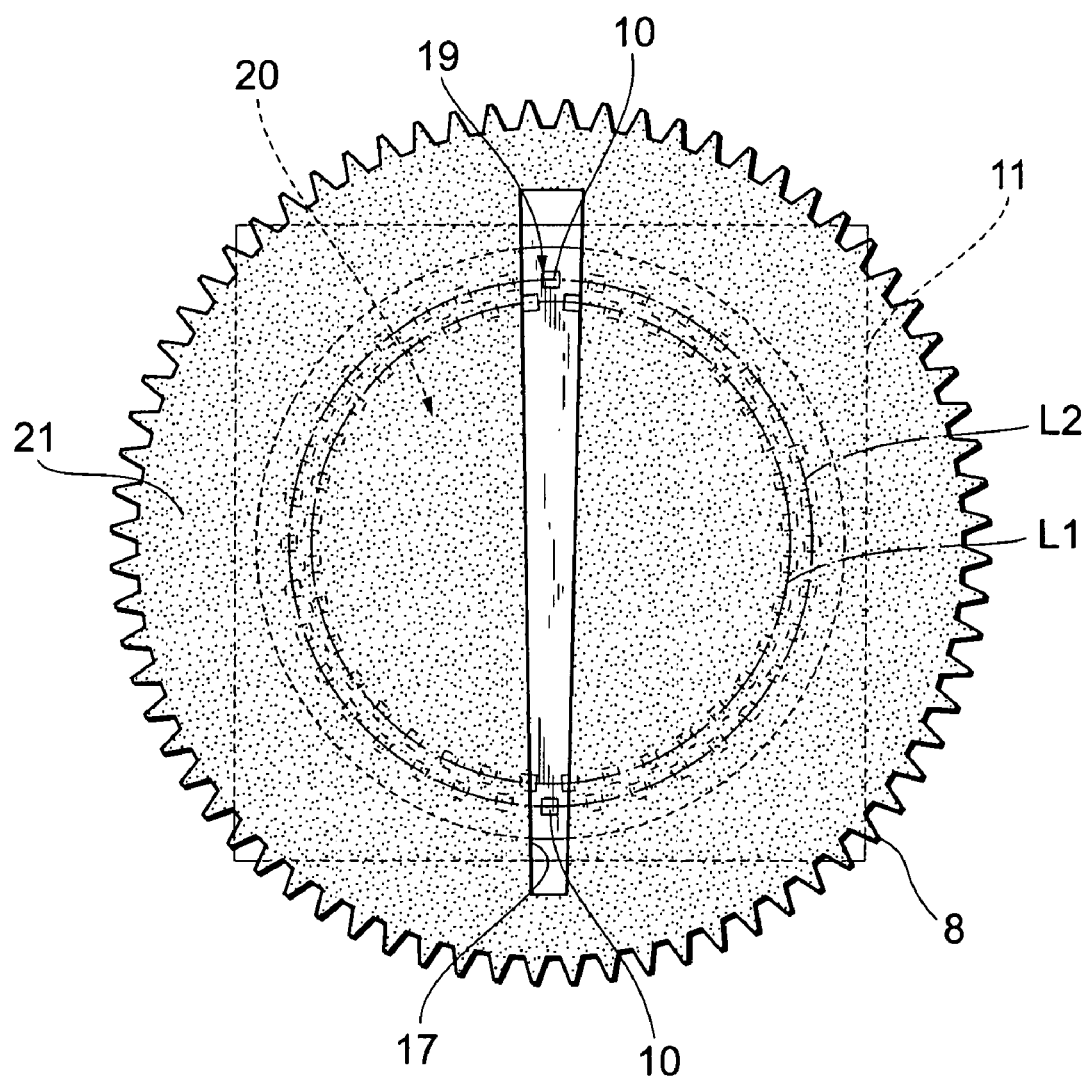
FIG. 5 is a view showing the arrangement relationship between a light transmitting portion and a scale.

When the measurement target rotates, the light transmitting portion 17 is rotated in the direction of an arrow B around the optical axis X of the light to be detected in cooperation between the disk 3 having the toothed gear and the rotating plate 8 having the toothed gear as shown in FIG. 1. The light to be detected that has passed through the light transmitting portion 17 is designed to have the same straight-line shape as that of the light transmitting portion 17. Accordingly, as shown in FIG. 5, a bright portion 19 to which the light to be detected is irradiated is formed in an area containing mutually separate parts of the arranged lines L1 and L2 of the scale plate 11, that is, a straight-line area containing parts of intersections between the arranged lines L1 and L2 and one end side and the other end side of the light transmitting portion 17. Furthermore, a part of the light to be detected that has not passed through the light transmitting portion 17 is absorbed by the light absorbing film 21. Accordingly, a dark portion 20 to which no light to be detected is irradiated is formed in the area of the scale plate 11 excluding the bright portion 19.

In such an optical system S, when the light to be detected is emitted from LED 6 being a spot light source, the light to be detected is collimated and bundled by the collimating lens 9A, and then made incident to the light transmitting portion 17 as shown in FIG. 2. The light to be detected which has passed through the light transmitting portion 17 and formed into the straight-line shape is converged by the collimating lens 9B, and one end side and the other end side of the light to be detected are made incident, at two spots, to the respective PDs 10 arranged annularly. The output signal based on the light intensity of the photodetected light to be detected is output from each PD 10, and output from the signal processor 16 to the outside.

Figure 6:
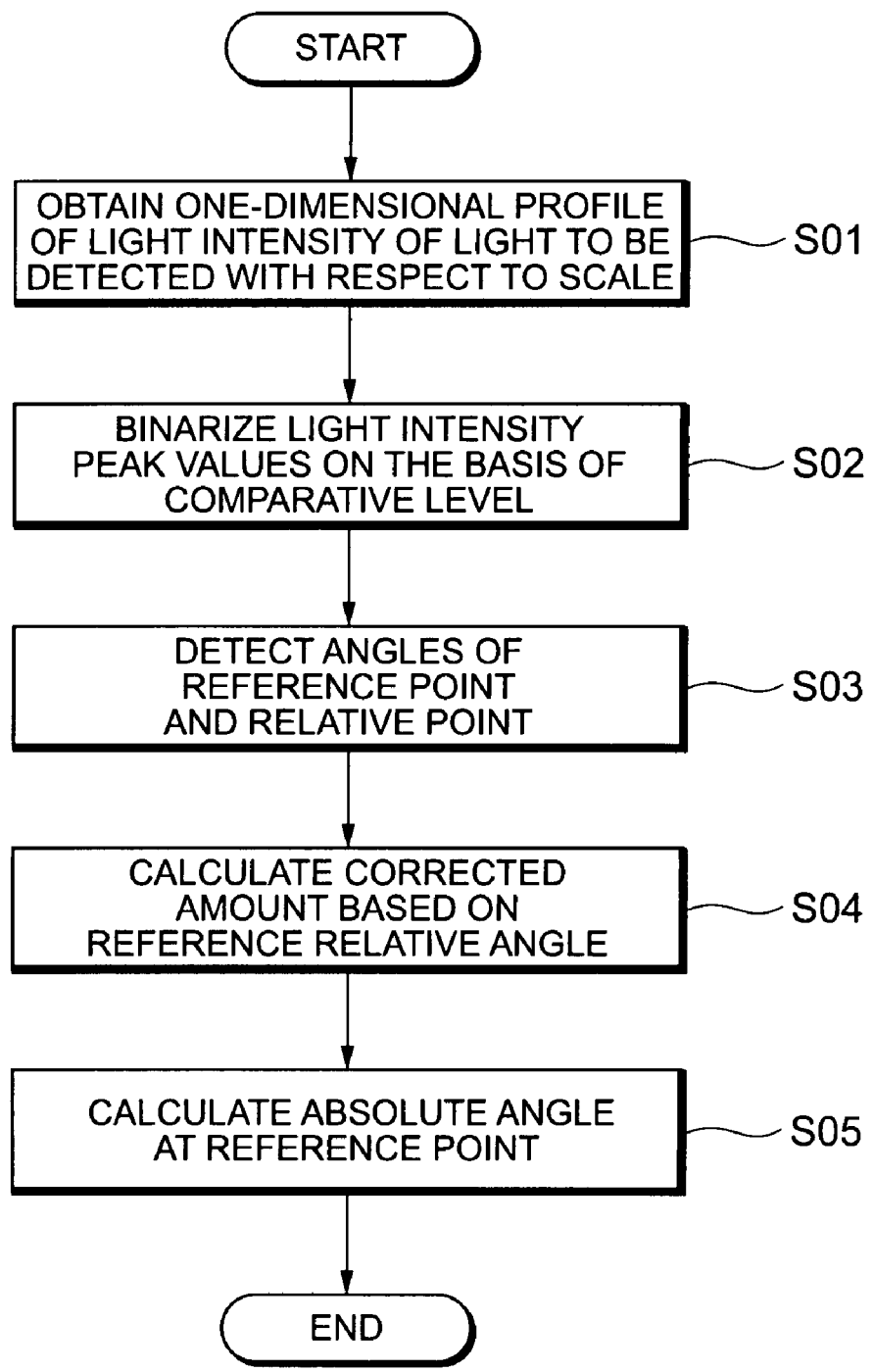
FIG. 6 is a flowchart showing the processing when an absolute angle of a measurement target is detected by the encoder shown in FIG. 1.

Next, the processing when the absolute angle of the measurement target is detected by the encoder 1 having the above construction will be described with reference to the flowchart of FIG. 6.

Figure 7:
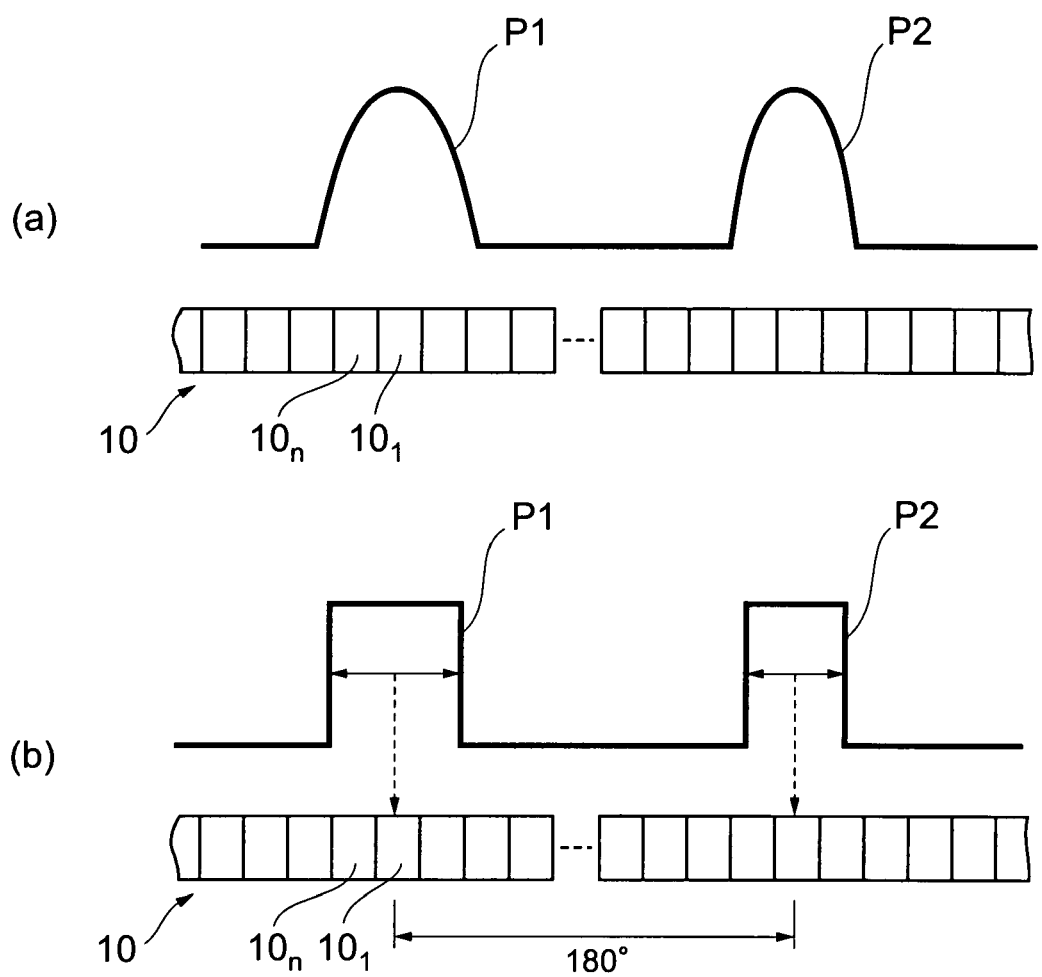
FIG. 7 are diagrams showing one-dimensional profiles of the light intensity of light to be detected.

First, the output signals obtained from the respective PDs 10 are collected, and a one-dimensional profile of the light intensity of the light to be detected with respect to the respective PDs 10 is acquired (step S01). At this time, in the encoder 1, the light to be detected that has passed through the light transmitting portion 17 is made incident, at two spots, to the respective PDs 10 arranged annularly, and thus when the one-dimensional profile is analyzed, two light intensity peaks P1 and P2 that are mutually separated are obtained as shown in FIG. 7(a). In addition, since the width W1 of one end side of the light transmitting portion 17 is about twice the width W2 of the other end side in the encoder 1, the light intensity peak P1 has a full width at half maximum about twice that of the light intensity peak P2.

Subsequently, the obtained light intensity peaks P1 and P2 are binarized on the basis of a predetermined comparative level (step S02). Thereafter, the PD 10 corresponding to the center at half maximum of the binarized light intensity peak P1 is set as a reference point to determine the absolute angle, and the PD 10 corresponding to the center at half maximum of the light intensity peak P2 is set as a relative point to determine a relative angle between the light intensity peaks P1 and P2. Then, the angles of the reference point and the relative point are detected on the basis of the angle information allocated to the respective PDs 10 (step S03).

Figure 8:
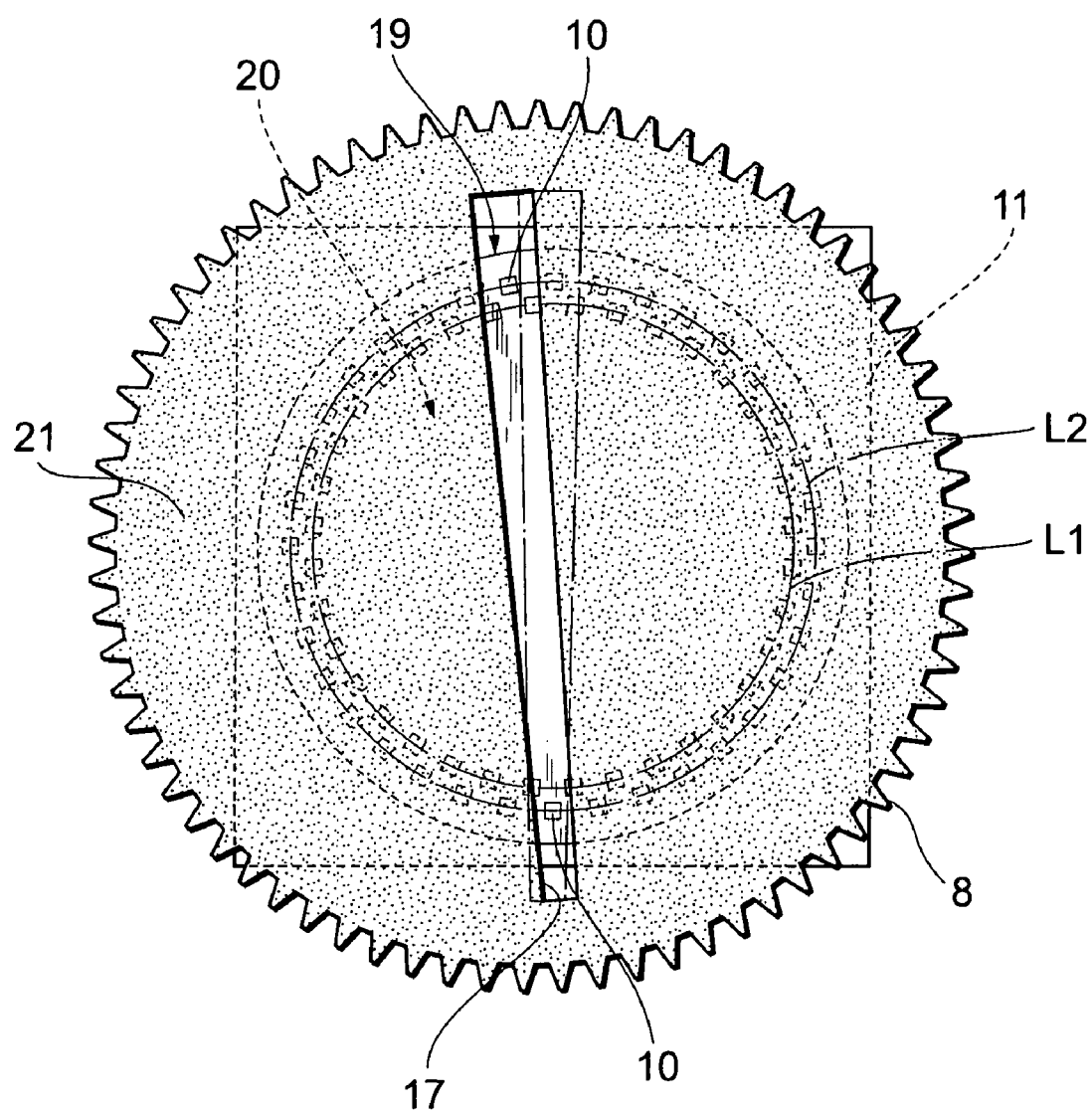
FIG. 8 is a view showing the arrangement relationship between the light transmitting portion and the scale when a positional displacement occurs.
Figure 9:
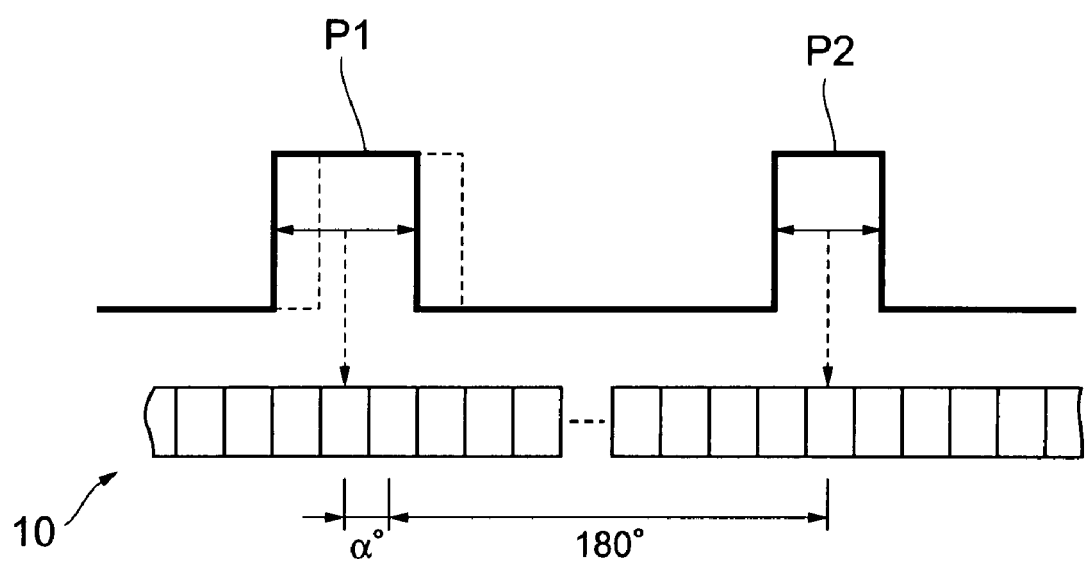
FIG. 9 is a diagram showing a one-dimensional profile of the light intensity of light to be detected when a displacement occurs.

Here, in the encoder 1, the light transmitting portion 17 is formed in a straight-line shape. Therefore, when the light transmitting portion 17 does not have a positional displacement with respect to the scale plate 11, the relative angle (hereinafter, referred to as "reference relative angle") between the reference point and the relative point is uniquely calculated as 180°. On the other hand, when the light transmitting portion 17 has a positional displacement with respect to the scale plate 11 because of a shaft displacement, a rotational displacement or the like of the rotating plate 8 having the toothed gear as shown in FIG. 8, for example, the position of the reference point is displaced by α° with respect to the true position, for example, as shown in FIG. 9. Therefore, the relative angle between the reference point and the relative point on detecting the angle is calculated as 180°+α°.

Therefore, if any difference α° occurs between the reference relative angle and the relative angle on detecting the angle, the α° is calculated as a corrected amount for the angular displacement (step S04). Then, the corrected amount α° is added to (or subtracted from) the angle of the reference point detected in step S03, thereby calculating the absolute angle at the reference point (step S05).

As described above, in the encoder 1, the light to be detected is passed through the straight-line light transmitting portion 17 formed in the rotating plate 8 having the toothed gear, whereby the bright portion 19 to which the light to be detected is irradiated is formed in the area containing the mutually separate parts of the arranged lines L1 and L2 on the scale plate 11, and the dark portion 20 to which no light to be detected is irradiated is formed in the area excluding the bright portion 19. Accordingly, the two light intensity peaks P1 and P2 are obtained from the one-dimensional profile of the output signal from the PDs 10, and the absolute angle can be calculated by specifying the PD 10 corresponding to one light intensity peak P1.

On the other hand, the relative angle between the light intensity peaks P1 and P2 (reference relative angle) can be uniquely calculated as 180° based on the shape of the light transmitting portion 17. Here, if the irradiated position of the light to be detected with respect to the scale plate 11 is displaced from the reference, the relative angle between the light intensity peaks P1 and P2 on detecting the angle is displaced from the reference relative angle by a fixed amount. Therefore, in the encoder 1, even when the irradiated position of the light to be detected with respect to the scale plate 11 is displaced from the reference, the absolute angle of the measurement target can be detected with high accuracy by calculating the deviation amount of the relative angle as a corrected amount α°, and adding/subtracting the corrected amount α° to/from the absolute angle determined by the light intensity peak P1.

Furthermore, in the encoder 1, the light transmitting portion 17 has a straight-line shape, and thus a formation thereof is easy and a reduction in the cost of the encoder 1 can be realized. In addition, the light transmitting portion 17 is formed of glass, and thus it is less likely to be clogged with dust as compared with a case where a slit is used, so that it is possible to suppress a reduction in the detection accuracy of the absolute angle due to level reduction in the output signal, etc., even when the encoder 1 is used for a long time. Furthermore, for the light transmitting portion 17, the width W1 of one end side thereof is different from the width W2 of the other end side. Therefore, by analyzing the one-dimensional profile of the output signal obtained from the respective PDs 10, the light intensity peaks P1 and P2 having different full widths at half maximum are obtained. Accordingly, the reference point and the relative point can be discriminated from each other, and extensive angle detection across the entire circumference of the scale becomes possible.

On the other hand, only the simple processing of outputting the output signal based on the light intensity of light to be detected made incident to each PD 10 to the outside is carried out at the photodetecting device 7 side, and thus the signal processing is rapidly carried out. Furthermore, a frame memory, etc., are not required, and miniaturization of the photodetecting device 7 and a reduction in the cost can be performed. Still furthermore, in the photodetecting device 7, the respective shift registers 13 are arranged in the substantially rectangular form so as to be concentric with the scale plate 11 inside the arranged lines L1 and L2. The photodetecting device 7 can be further miniaturized by arranging the respective shift registers 13 in an extra space inside the arranged lines L1 and L2.

Furthermore, in the scale plate 11, the respective PDs 10 are arranged in the zigzag form over the annularly arranged lines L1 and L2. The above arrangement of PDs 10 can keep the scale plate 11 compact and enhance the resolution of the angle detection. In addition, the light absorbing film 18 is formed in the area on the surface of the scale plate 11 in the area excluding the area where the PDs 10 are arranged. Accordingly, the effect of multiple reflection of the light to be detected, etc., can be moderated, and the S/N ratio of the one-dimensional profile of the output signal obtained from the respective PDs 10 can be enhanced.

Second Embodiment

Figure 10:
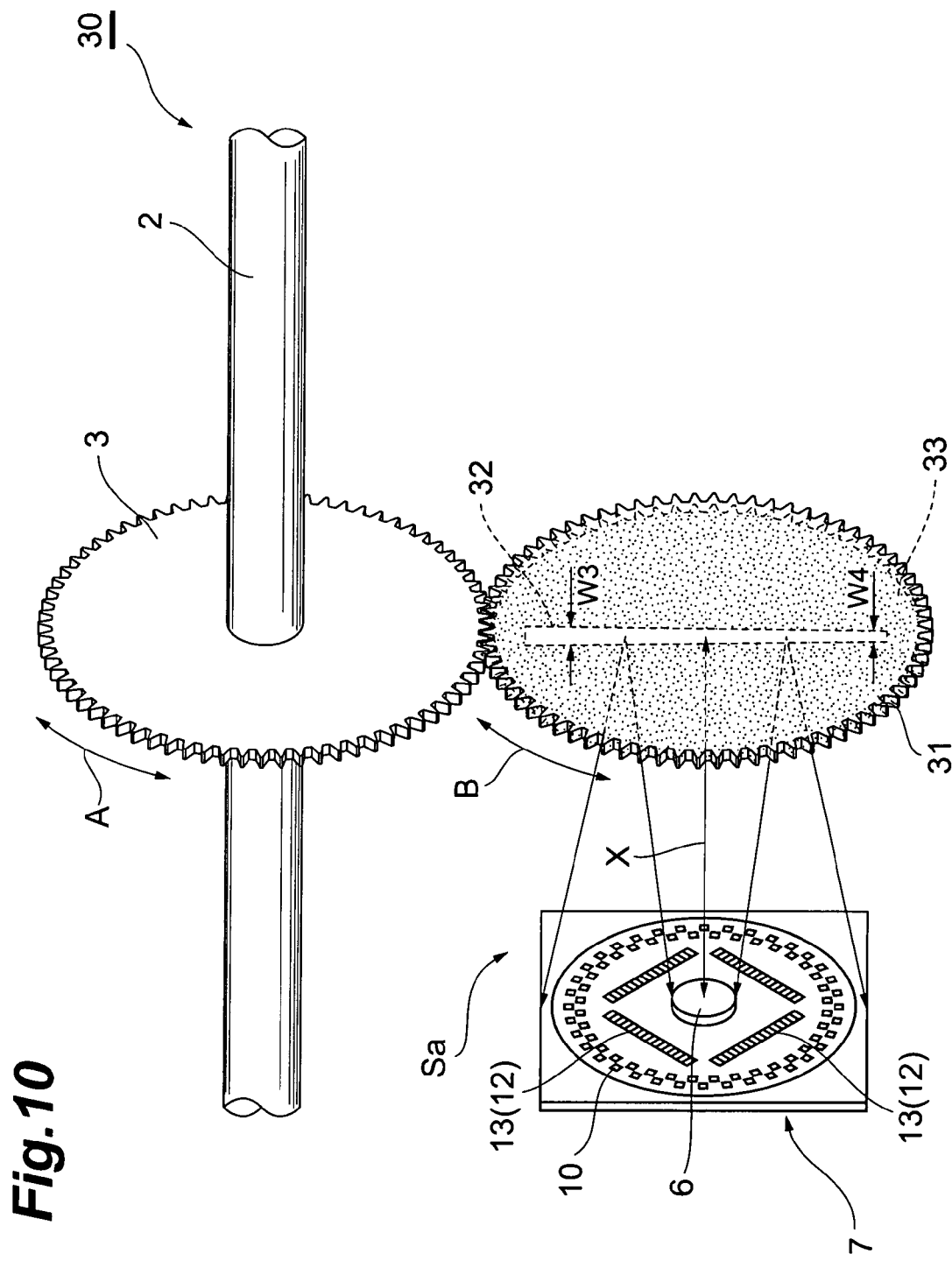
FIG. 10 is a perspective view showing an encoder according to a second embodiment of the present invention.

Subsequently, an encoder according to a second embodiment of the present invention will be described. As shown in FIG. 10, the difference of an encoder 30 according to the second embodiment from the first embodiment in which the light to be detected is passed through the light transmitting portion 17 of the rotation plate 8 having the toothed gear resides in that light to be detected emitted from LED 6 is reflected from a light reflecting portion 32 of the rotating plate 31 having the toothed gear when the bright portion 19 and the dark portion 20 are formed on the scale plate 11.

That is, in the optical system Sa of the encoder 30, the rotating plate 31 having the toothed gear has a light reflecting portion 32 for reflecting a part of the light to be detected emitted from LED 6. The light reflecting portion 32 is formed of, for example, aluminum thin film in a straight-line shape so as to pass through the center of the rotating plate 31 having the toothed gear. In addition, the light reflecting portion 32 is formed, similar to the light transmitting portion 17 in the first embodiment, so that the width is gradually reduced from one end side to the other end side, and the width W3 of one end side of the light reflecting portion 32 is about twice the width W4 of the other end side. Furthermore, in the rotating plate 31 having the toothed gear, a light absorbing film 33 which is formed of black resin containing carbon, for example, is formed at the portion excluding the light reflecting portion 32 by print or the like. And, LED 6 is disposed at the center portion of the scale plate 11 in the photodetecting device 7.

In this encoder 30, when light to be detected is emitted from LED 6 to the rotating plate 31 having the toothed gear, a straight-line part of the light to be detected which impinges against the light reflecting portion 32 is reflected to the photodetecting device 7 side. Accordingly, similar to the first embodiment, the bright portion 19 to which the light to be detected is irradiated is formed in the area containing the mutually separate parts of the arranged lines L1 and L2 in the scale plate 11, that is, the straight-line area containing the parts of intersections between the arranged lines L1 and L2 and one end side and the other end side of the light reflecting portion 32 (see FIG. 5). Furthermore, a part of the light to be detected which does not impinge against the light reflecting portion 32 is absorbed by the light absorbing film 33. Accordingly, the dark portion 20 to which no light to be detected is irradiated is formed in the area excluding the bright portion 19 of the scale plate 11. The output signal based on the light intensity of the photodetected light to be detected is output from each PD 10, and then output from the signal processor 16 to the outside. Accordingly, with this encoder 30, by analyzing the one-dimensional profile of the output signal of the light to be detected according to the same procedure as the first embodiment, the absolute angle of the measurement target can be detected with high accuracy even when the irradiated position of the light to be detected with respect to the scale plate 11 is displaced from the reference.

Furthermore, in the encoder 30, the straight-line light reflecting portion 32 is used to form the bright portion 19 and the dark portion 20, and thus it is unlikely to be clogged with dust as in the case of the first embodiment. Accordingly, even when the encoder 30 is used for a long time, the detection accuracy of the absolute angle can be suppressed from being reduced due to level reduction in the output signal, etc. Furthermore, LED 6 is disposed at the scale plate 11 side, and thus the optical system Sa can be miniaturized. In addition, for the light reflecting portion 32, the width W3 of one end side is different from the width W4 of the other end side. Therefore, by analyzing the one-dimensional profile of the output signal obtained from the respective PDs 10, the light intensity peaks P1 and P2 having different full widths at half maximum are obtained. Accordingly, the reference point and the relative point can be discriminated from each other, and extensive angle detection across the entire circumference of the scale becomes possible.

The present invention is not limited to the above embodiments. For example, in the encoder 1 according to the first embodiment, the light absorbing film 21 is formed in the area excluding the light transmitting portion 17 in the rotating plate 8 having the toothed gear. However, in place of the light absorbing film 21, a light reflecting film (not shown) may be formed. In this case, the light to be detected which does not pass through the light transmitting portion 17 is reflected from the light reflecting film to the opposite side of the photodetecting device 7, so that the S/N ratio of the one-dimensional profile of the output signal obtained from the respective PDs 10 can be enhanced.

In addition, in the encoder 1 and the encoder 30, the formation pattern of the bright portion 19 and the dark portion 20 to be formed on the scale plate 11 may be inverted. That is, in the encoder 1, a light absorbing film (or light reflecting film) may be formed at the forming position of the light transmitting portion 17 in the rotating plate 8 having the toothed gear, and a light transmitting portion may be formed in the other area. Likewise, in the encoder 30, a light transmitting portion (or light absorbing film) may be formed at the forming position of the light reflecting portion 32 in the rotating plate 31 having the toothed gear, and a light transmitting portion may be formed in the other area.

In this case, a one-dimensional profile of an output signal obtained from the respective PDs 10 is inverted from that in the case of the above embodiment, however, by carrying out the same processing as the aforementioned step S01 to step S05 based on two bottoms obtained in place of the light intensity peaks P1 and P2, the absolute angle of a measurement target can be detected with high accuracy even when the irradiated position of light to be detected with respect to the scale plate 11 is displaced from a reference.

Third Embodiment

Subsequently, an encoder according to a third embodiment of the present invention will be described.

Figure 11:
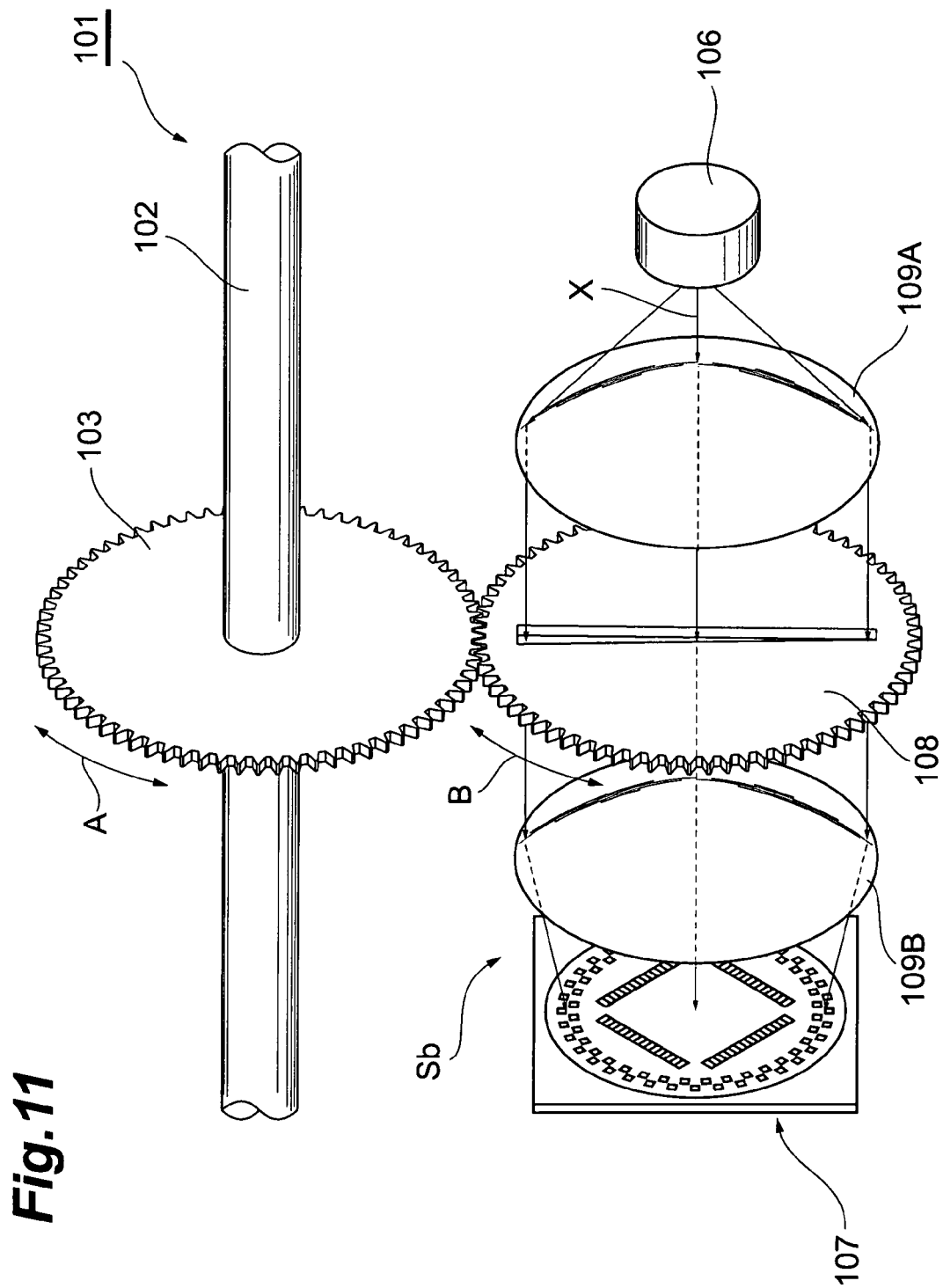
FIG. 11 is a perspective view showing an encoder according to a third embodiment of the present invention.

FIG. 11 is a perspective view showing an embodiment of an encoder according to the present invention. The encoder 101 shown in FIG. 11 is a so-called absolute type rotary encoder, and it is a device for detecting the absolute angle of a measurement target (not shown) such as the handle of a vehicle or the like. This encoder 101 is equipped with a rotational shaft 102 linked to the measurement target, and a disk 103 having a toothed gear fixed to the rotational shaft 102. The disk 103 having the toothed gear is rotated in the direction of an arrow A in connection with the rotation of the rotational shaft 102 interlocked with the measurement target.

Figure 12:
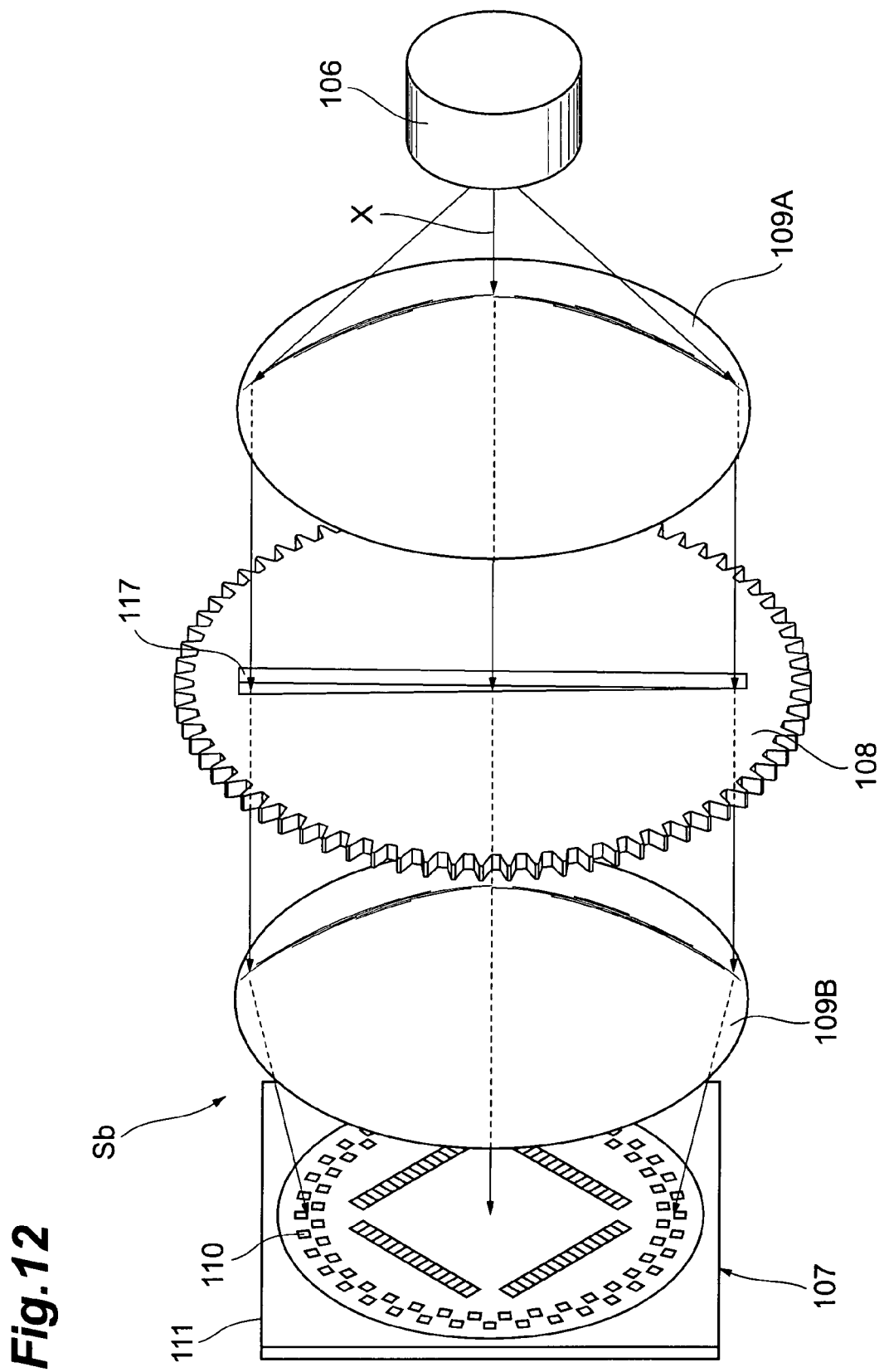
FIG. 12 is a perspective view showing an optical system of the encoder shown in FIG. 11.

FIG. 12 is a perspective view showing an optical system Sb of the encoder 101. As shown in FIG. 12, the optical system Sb of the encoder 101 is composed of an LED (light source device) 106 being a spot light source for emitting light to be detected, a photodetecting device (photodetecting device for an encoder) 107 that is disposed so as to face LED 6 and photodetects the light to be detected, a slit plate (rotating member) 108 having a toothed gear which is engaged with the disk 103 having the toothed gear, and a pair of collimating lens 109A and 109B disposed so as to sandwich the slit plate 108 having the toothed gear therebetween.

Figure 13:
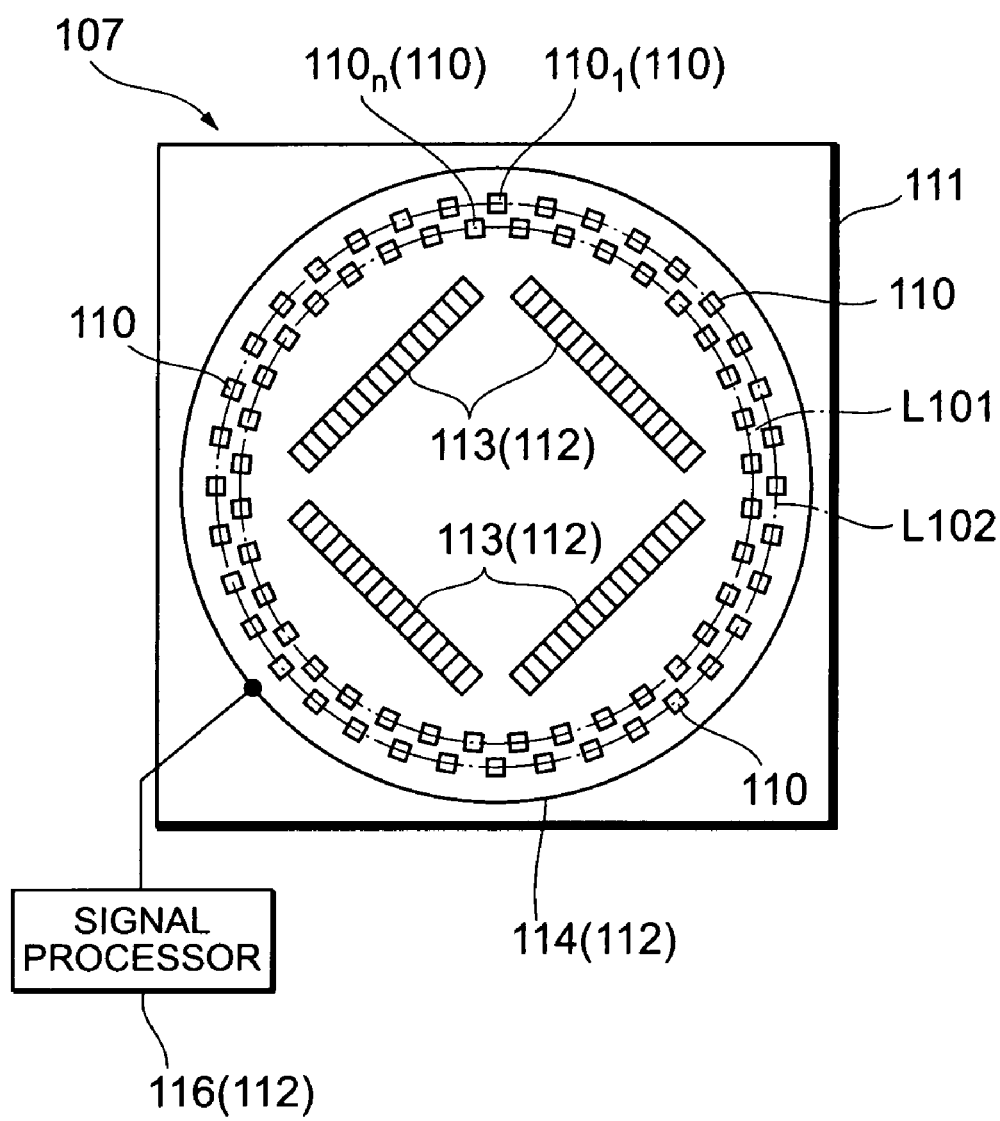
FIG. 13 is a plan view of a photodetecting device.

As shown in FIG. 13, the photodetecting device 107 has a scale plate 111 having a plurality of PDs (photodetecting elements) 110 arranged thereon, and an output portion 112 for outputting an output signal from each PD 110. A first arranged line L101 and a second arranged line L102 are concentrically set on a rim portion of the scale plate 111, and the respective PDs 110 are annularly arranged in a zigzag form on the arranged lines L101 and L102. Angle information is allocated to the respective PDs 110 from the first PD $110_1$ (0°) to the last PD $110_n$ (359.5°), for example, at an angular interval of 0.5° in the clockwise direction.

The output portion 112 has a plurality of (four in this embodiment) shift registers 113, a video line 114 and a signal processor 116. The respective shift registers 113 are arranged in a substantially rectangular form concentrically with the scale plate 111 at the inside of the respective arranged lines L101 and L102, and supply scan signals to the respective PDs 110 for outputting the output signal based on the light intensity of the photodetected light to be detected. The video line 114 is concentrically arranged at the outside of the arranged lines L101 and L102, and outputs an output signal from each PD 110 to the signal processor 116. The signal processor 116 outputs the output signal received from each PD 110 via the video line 114 to the outside. A supply line (not shown) for a driving signal to each shift register 113 is connected between PD $110_1$ and PD $110_n$, for example.

Figure 14:
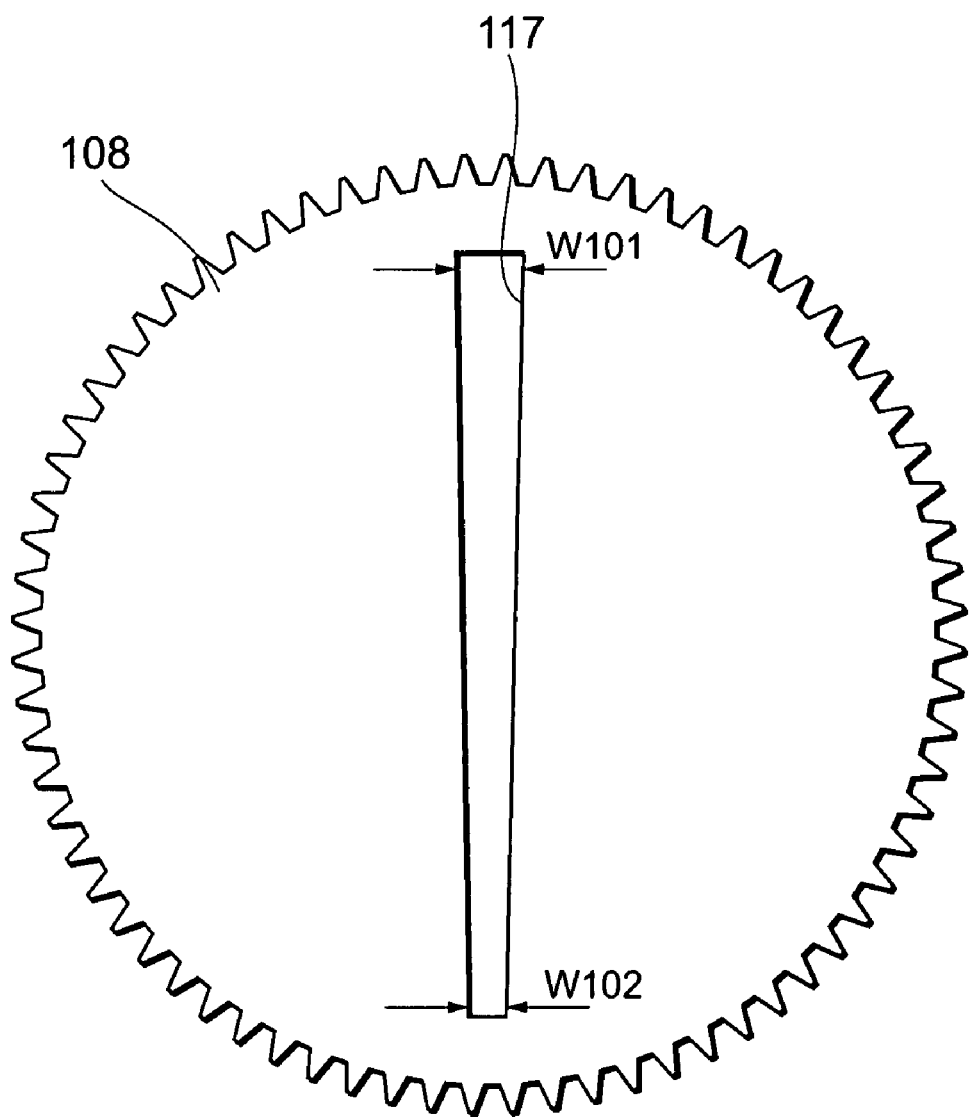
FIG. 14 is a plan view of a slit plate having a toothed gear.

On the other hand, as shown in FIG. 14, the slit plate 108 having the toothed gear has a slit 117 through which a part of the light to be detected emitted from LED 106 is passed. The slit 117 is formed in a straight-line shape so as to pass through the center of the slit plate 108 having the toothed gear. In addition, the slit 117 is formed so that the slit width is gradually reduced from one end side to the other end side, and the slit width W101 of one end side is about twice the slit width W102 of the other end side.

Figure 15:
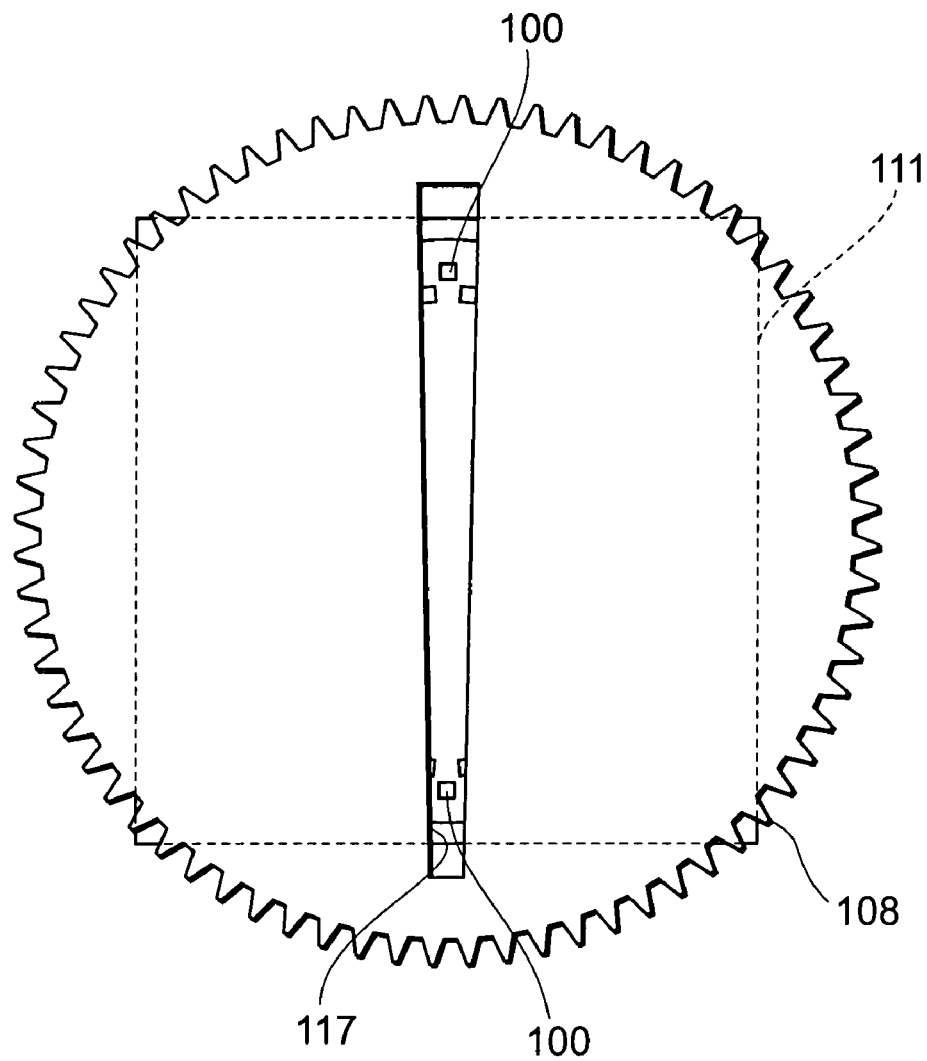
FIG. 15 is a view showing the arrangement relationship between a slit and a scale.

When the measurement target rotates, the slit 117 is rotated in the direction of an arrow B around the optical axis X of the light to be detected in cooperation between the disk 103 having the toothed gear and the slit plate 108 having the toothed gear as shown in FIG. 11. The light to be detected that has passed through the slit 117 has the same straight-line shape as the shape of the slit 117, and intersects, as shown in FIG. 15, at two spots of one end side and the other end side different in the slit width from each other, with the respective arranged lines L101 and L102.

In such an optical system Sb, when the light to be detected is emitted from LED 106 being a spot light source, the light to be detected is collimated and bundled by the collimating lens 109A, and then made incident to the slit 117 as shown in FIG. 12. The light to be detected which has passed through the slit 117 and formed into the straight-line shape is converged by the collimating lens 109B, and one end side and the other end side of the light to be detected are made incident, at two spots, to the respective PDs 110 arranged annularly. The output signal based on the light intensity of the photodetected light to be detected is output from each PD 110, and output from the signal processor 116 to the outside.

Figure 16:
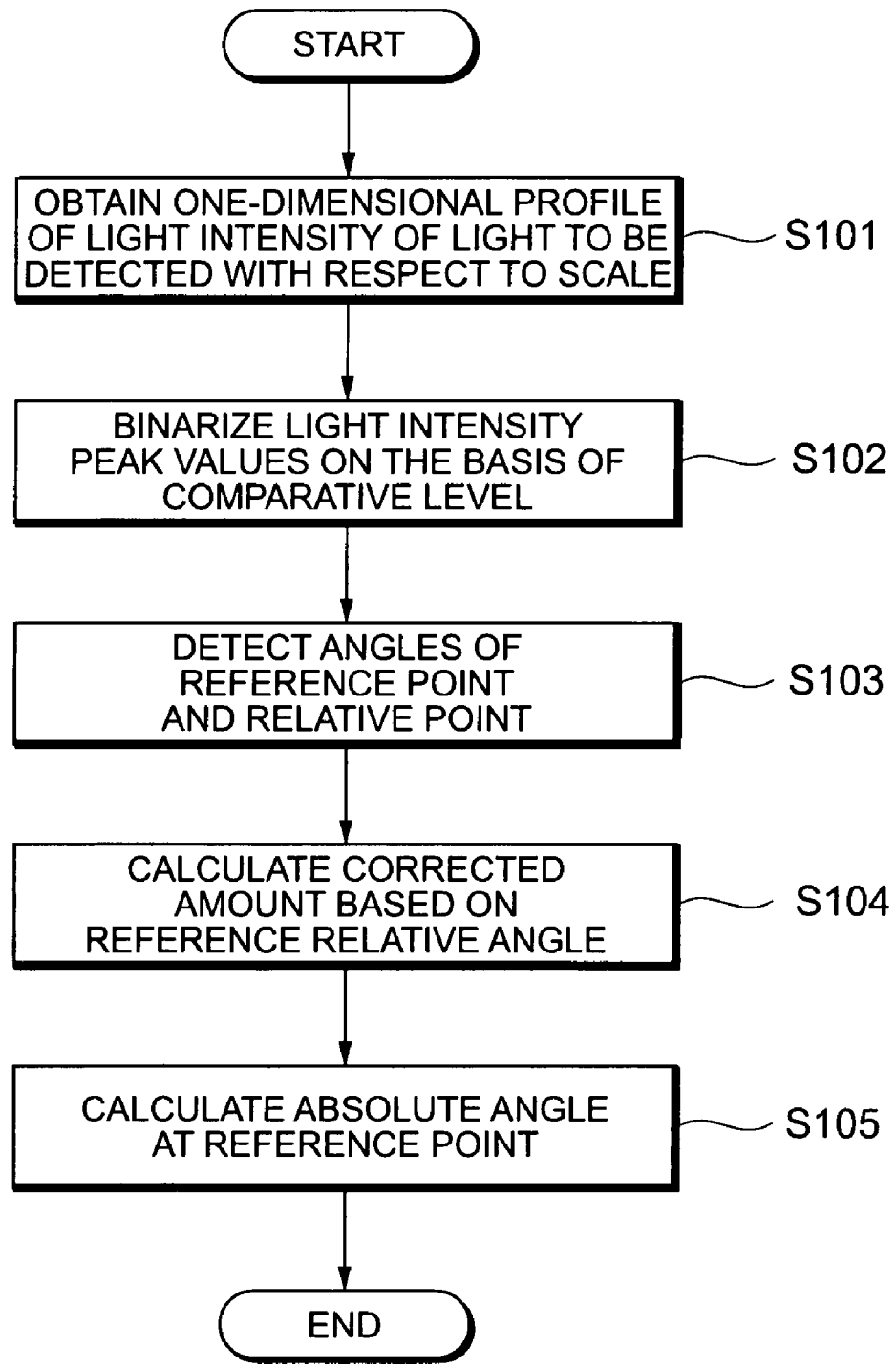
FIG. 16 is a flowchart showing the processing when an absolute angle of a measurement target is detected by the encoder shown in FIG. 11.

Next, the processing when the absolute angle of the measurement target is detected by the encoder 101 having the above construction will be described with reference to the flowchart of FIG. 16.

Figure 17:
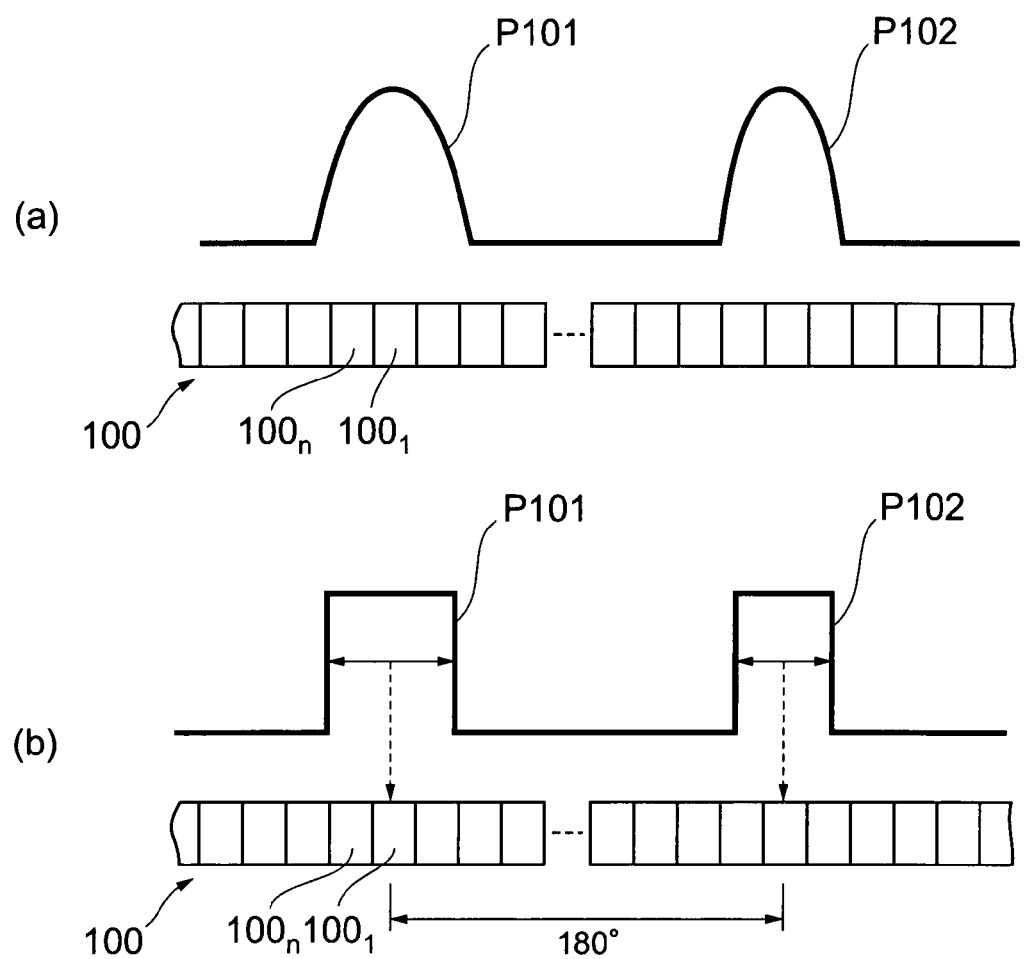
FIG. 17 are diagrams showing one-dimensional profiles of the light intensity of light to be detected.

First, the output signals obtained from the respective PDs 110 are collected, and a one-dimensional profile of the light intensity of the light to be detected with respect to the respective PDs 110 is acquired (step S101). At this time, in the encoder 101, the light to be detected that has passed through the slit 117 is made incident, at two spots, to the respective PDs 110 arranged annularly, and thus when the one-dimensional profile is analyzed, two light intensity peaks P101 and P102 mutually separated are obtained as shown in FIG. 17(a). In addition, since the slit width W101 of one end side of the light transmitting portion 17 is about twice the slit width W102 of the other end side in the encoder 101, the light intensity peak P101 has a full width at half maximum about twice that of the light intensity peak P102.

Subsequently, the obtained light intensity peaks P101 and P102 are binarized on the basis of a predetermined comparative level (step S102). Thereafter, the PD 110 corresponding to the center at half maximum of the binarized light intensity peak P101 is set as a reference point to determine the absolute angle, and the PD 110 corresponding to the center at half maximum of the light intensity peak P102 is set as a relative point to determine a relative angle between the light intensity peaks P101 and P102. Then, the angles of the reference point and the relative point are detected on the basis of the angle information allocated to the respective PDs 110 (step S103).

Figure 18:
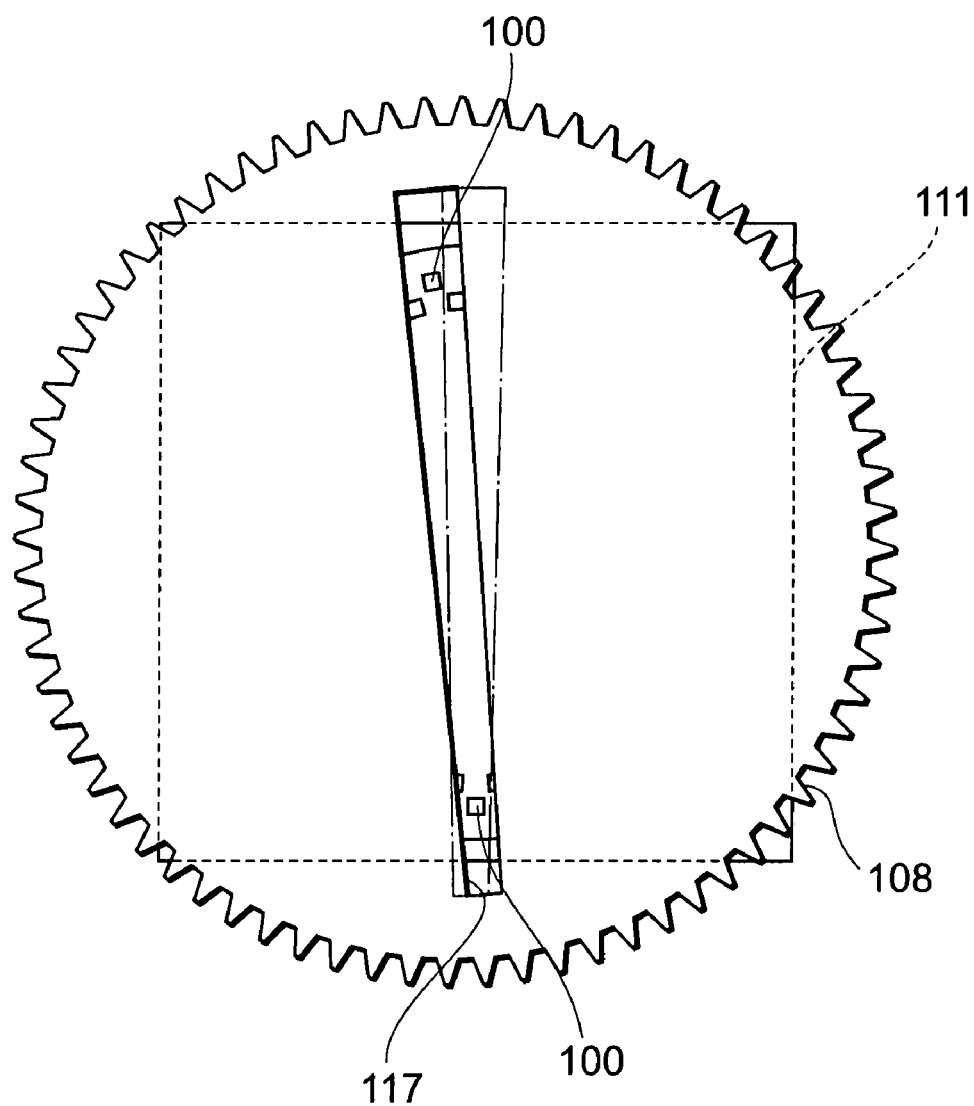
FIG. 18 is a view showing the arrangement relationship between the slit and the scale when a positional displacement occurs.
Figure 19:
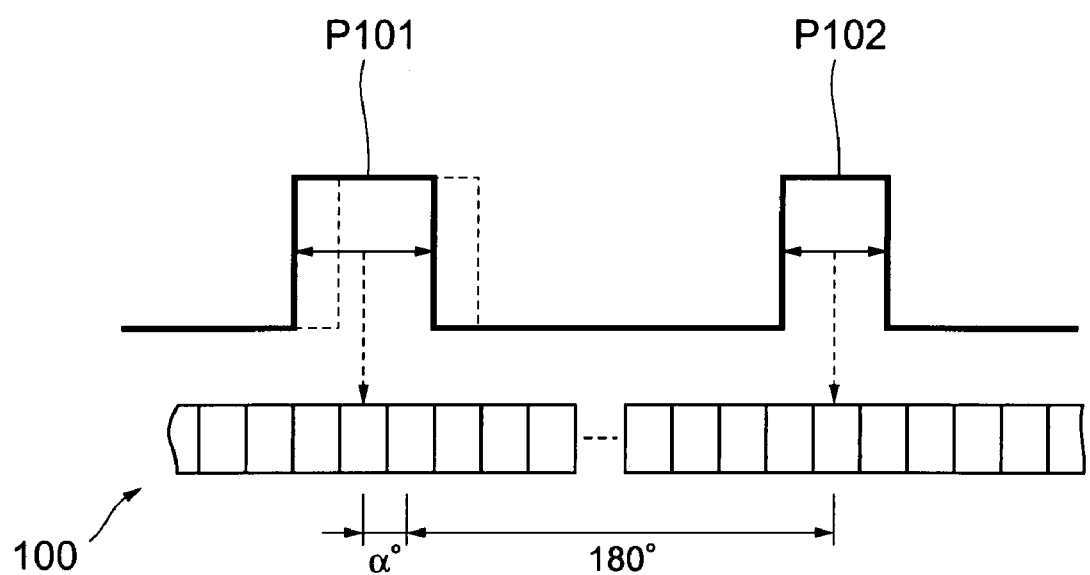
FIG. 19 is a diagram showing a one-dimensional profile of the light intensity of light to be detected when a positional displacement occurs.

Here, in the encoder 101, the slit 117 is formed in a straight-line shape. Therefore, when the light transmitting portion 117 does not have a positional displacement with respect to the scale plate 111, the relative angle (hereinafter, referred to as "reference relative angle") between the reference point and the relative point is uniquely calculated as 180°. On the other hand, when the light transmitting portion 117 has a positional displacement with respect to the scale plate 111 because of a shaft displacement, a rotational displacement or the like of the rotating plate 108 having the toothed gear as shown in FIG. 18, for example, the position of the reference point is displaced by α° with respect to the true position, for example, as shown in FIG. 19. Therefore, the relative angle between the reference point and the relative point on detecting the angle is calculated as 180°+α°.

Therefore, if any difference α° occurs between the reference relative angle and the relative angle on detecting the angle, the α° is calculated as a corrected amount for the angular displacement (step S104). Then, the corrected amount α° is added to (or subtracted from) the angle of the reference point detected in step S103, thereby calculating the absolute angle at the reference point (step S105).

As described above, in the encoder 101, the light to be detected that has passed through the straight-line slit 117 is detected at two spots of the plurality of PDs 110 arranged annularly as a scale. At this time, the reference relative angle between the reference point corresponding to the light intensity peak P101 of the light to be detected and the relative point corresponding to the light intensity peak P102 can be uniquely calculated as 180° based on the shape of the straight-line slit 117. Accordingly, in the encoder 101, even if the slit 117 has a positional displacement with respect to the scale plate 111, the absolute angle of the measurement target can be detected with high accuracy by calculating a corrected amount α° based on the deviation amount of the relative angle between the reference point and relative point on detecting the angle from the reference relative angle.

Furthermore, in the encoder 101, the light transmitting portion 117 has a straight-line shape, and thus a formation thereof is easy and a reduction in the cost of the encoder 101 can be realized. Furthermore, for the slit 117, the slit width W101 of one end side is different from the slit width W102 of the other end side, and thus the light intensity peaks P101 and P102 having different full widths at half maximum are obtained. Accordingly, the reference point and the relative point can be discriminated from each other, and extensive angle detection across the entire circumference of the scale becomes possible.

Furthermore, in the encoder 101, the respective PDs 110 are arranged in the zigzag form over the annularly arranged lines L101 and L102. The above arrangement of PDs 110 can keep the scale plate 111 compact and enhance the resolution of the angle detection.

On the other hand, only the simple processing of outputting the output signal based on the light intensity of light to be detected made incident to each PD 110 to the outside is carried out at the photodetecting device 107 side, and thus the signal processing is rapidly carried out. Furthermore, a frame memory, etc., are not required, and miniaturization of the photodetecting device 107 and a reduction in the cost can be performed. Still furthermore, in the photodetecting device 107, the respective shift registers 113 are arranged in the substantially rectangular form so as to be concentric with the scale plate 111 inside the arranged lines L101 and L102. The photodetecting device 107 can be further miniaturized by arranging the respective shift registers 13 in an extra space inside the arranged lines L101 and L102.

Figure 20:
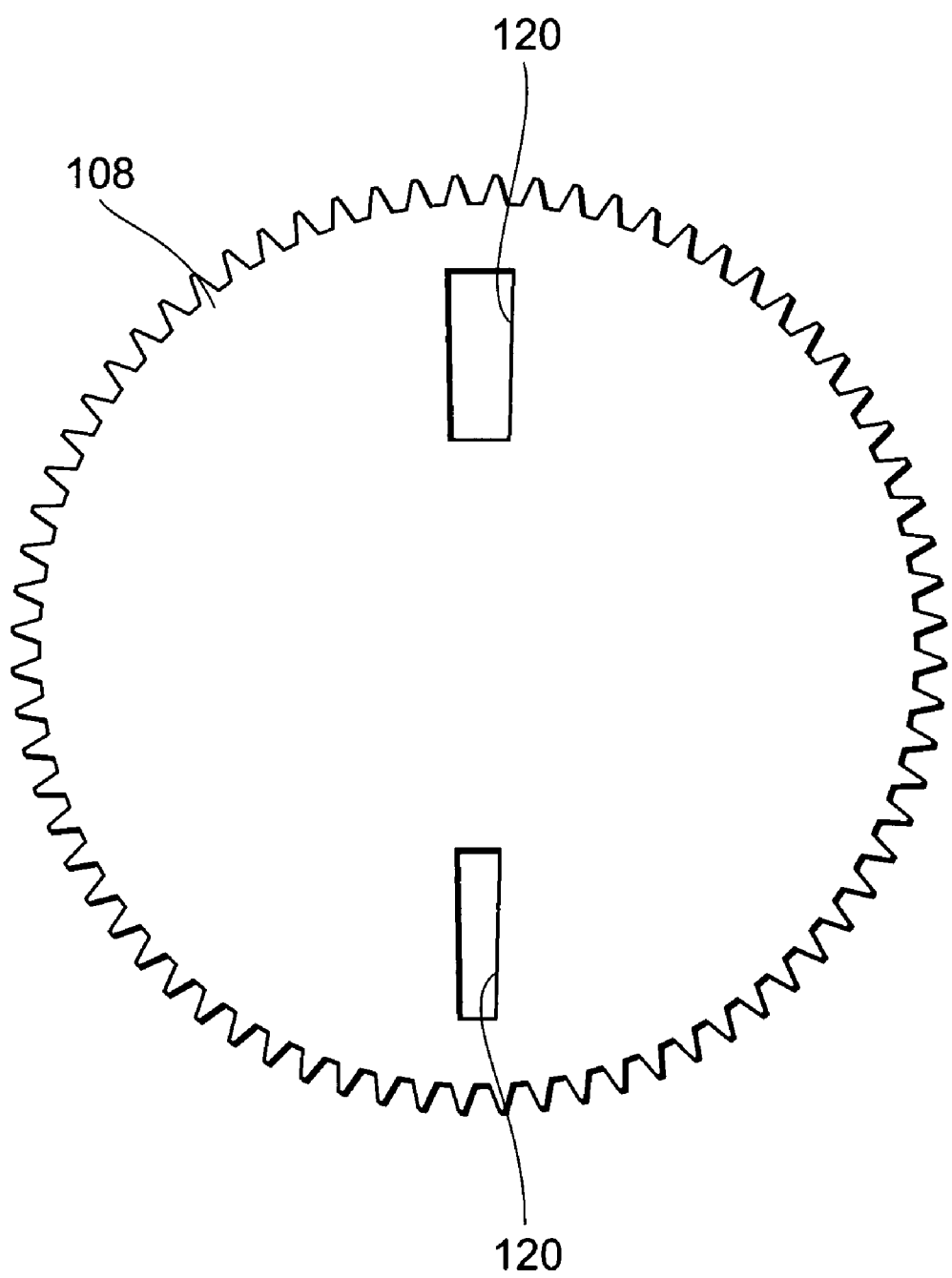
FIG. 20 is a plan view of a slit according to a modification.

The present invention is not limited to the above embodiments. For example, a slit formed in the slit plate 108 having the toothed gear may have a shape, as in a slit 120 shown in FIG. 20, where one end side and the other end side are separated. In this case, no light to be detected is transmitted from a center part of the slit plate 108 having the toothed gear, and thus the S/N ratio of the light intensity peaks P101 and P102 are enhanced, so that the absolute angle of the measurement target can be detected with a higher accuracy. In addition, photodetecting device 107 may be loaded with an A/D converter so as to make the output signal from each PD 110 as a digital output.

Here, from a standpoint of detecting the absolute angle with high accuracy, the slit width W101 of one end side of the slit 117 and the slit width W102 of the other end side may be equal to each other. In this case, the reference point cannot be discriminated from the reference point, so that the angle detection range of the encoder 101 is substantially limited to a range of 180°. Therefore, a gear or the like (not shown) that rotates the slit plate 108 having the toothed gear half round with respect to one round of the disk 103 having the toothed gear may be interposed.

The following problems to be solved are derived from the third embodiment of the present invention described above.

That is, an encoder according to the present invention includes: a rotating member having a slit formed thereon; a light source device for emitting light to be detected to the slit; and a photodetecting device including a scale having a plurality of photodetecting elements arranged thereon, and an output portion for outputting an output signal based on the light intensity of the light to be detected made incident to the photodetecting elements after passing through the slit, wherein the photodetecting elements are arranged along an annularly arranged line on the scale, and the light to be detected that has passed through the slit intersects with the arranged line at, at least, two spots mutually separated.

In the encoder, the light to be detected that has passed through the slit is detected at, at least, two mutually separate spots of the plurality of photodetecting elements arranged annularly as a scale. At this time, by providing either one of the points where the output signal peaks as a reference point to calculate an absolute angle, a relative angle of the reference point from the other point (reference relative angle) can be grasped from the shape of the slit in advance. Here, if the slit has a positional displacement with respect to the scale, a relative angle between the reference point and the other point on detecting the angle is displaced from the reference relative angle by a fixed amount. Therefore, in this encoder, the deviation amount of the relative angle is calculated as a corrected amount, and the corrected amount is added to or subtracted from an absolute angle indicated by the reference point, whereby the absolute angle can be detected with high accuracy even when the slit has a positional displacement with respect to the scale.

In addition, it is preferable that the slit has a straight-line shape, and an end side and the other end side of the light to be detected that has passed through the slit respectively intersect with the arranged line. It is easy to form the straight line slit, whereby a reduction in the cost of the encoder can be realized In addition, it is preferable that, for the slit, the width of one end side is different from the width of the other end side. In this case, since an output signal having different peaks at the reference point and the other point is obtained, the reference point can be discriminated from the other point.

In addition, it is preferable that the photodetecting elements are arranged in a zigzag form along the arranged line. In this case, the resolution of the angle detection can be enhanced while keeping the scale compact.

A photodetecting device for an encoder according to the present invention includes: a scale having a plurality of photodetecting elements arranged thereon; and an output portion for outputting an output signal based on light intensity of light to be detected made incident to the photodetecting elements, wherein the photodetecting elements are arranged along an annularly arranged line on the scale.

The photodetecting device for an encoder includes the plurality of photodetecting elements arranged annularly as a scale. Therefore, by interposing a rotating member having a slit formed thereon between the same and a light source device, it becomes possible to detect the light to be detected that has passed through the slit at, at least, two spots mutually separated. At this time, by providing either one of the points where the output signal peaks as a reference point to calculate an absolute angle, a relative angle of the reference point from the other point (reference relative angle) can be grasped from the shape of the slit in advance. Here, if the slit has a positional displacement with respect to the scale, a relative angle between the reference point and the other point on detecting the angle is displaced from the reference relative angle by a fixed amount. Therefore, in this photodetecting device for an encoder, the deviation amount of the relative angle is calculated as a corrected amount, and the corrected amount is added to or subtracted from an absolute angle indicated by the reference point, whereby the absolute angle can be detected with high accuracy even when the slit has a positional displacement with respect to the scale.

In addition, it is preferable that the output portion has a shift register that makes the output signal based on light intensity output in sequence from the photodetecting elements, and the shift register is arranged inside the arranged line. It becomes possible to miniaturize the scale by arranging the shift register in an extra space inside the arranged line.

In addition, it is preferable that the photodetecting elements are arranged in a zigzag form along the arranged line. In this case, the resolution of the angle detection can be enhanced while keeping the scale compact.

The invention claimed is:

1. An encoder comprising:
   a rotating member;
   a light source device for emitting light to be detected to the rotating member; and
   a photodetecting device including a scale having a plurality of photodetecting elements arranged thereon, and an output portion for outputting an output signal based on light intensity of the light to be detected made incident to the photodetecting elements through the rotating member, wherein
   the photodetecting elements are arranged along an annularly arranged line on the scale, and
   the rotating member is designed so that, in the scale, an area containing mutually separate parts of the arranged line is set as a bright portion to which the light to be detected is irradiated, and an area containing the other portion excluding the parts of the arranged line concerned is set as a dark portion to which no light to be detected is irradiated,
   wherein the light to be detected is irradiated at, at least, two mutually separated spots of the arranged line.

2. The encoder according to claim 1, wherein a straight-line light transmitting portion is formed in the rotating member, and
   the bright portion is formed of the light to be detected that has passed through the light transmitting portion.

3. The encoder according to claim 2, wherein for the light transmitting portion, a width of one end side is different from a width of the other end side.

4. The encoder according to claim 2, wherein the light transmitting portion is a slit.

5. The encoder according to claim 1, wherein a straight-line light reflecting portion is formed in the rotating member, and
   the bright portion is formed of the light to be detected reflected from the light reflecting portion.

6. The encoder according to claim 5, wherein for the light reflecting portion, a width of one end side is different from a width of the other end side.

7. The encoder according to claim 1, wherein the photodetecting elements are arranged in a zigzag form along the arranged line.

8. The encoder according to claim 1, wherein, in the scale, a light absorbing film is formed in an area excluding the area where the photodetecting elements are arranged.

9. The encoder according to claim 1, wherein an absolute angle is calculated by obtaining at least two light intensity peaks from an output signal from the photodetecting elements and specifying the photodetecting element corresponding to one light intensity peak.

10. The encoder according to claim 1, wherein the light to be detected is detected at, at least, via two mutually separated spots of the plurality of photodetector elements.

* * * * *